United States Patent [19]

Donnelly et al.

[11] Patent Number: 5,023,811
[45] Date of Patent: Jun. 11, 1991

[54] METHOD AND APPARATUS FOR SELECTIVELY PROCESSING PAGINATED OUTPUT

[75] Inventors: Kim F. Donnelly; Kurt A. Gluck, both of Piscataway, N.J.

[73] Assignee: Bell Communications Research, Inc., Livingston, N.J.

[21] Appl. No.: 535,991

[22] Filed: Jun. 11, 1990

Related U.S. Application Data

[63] Continuation of Ser. No. 257,218, Oct. 13, 1988, abandoned.

[51] Int. Cl.$^5$ .............................................. G06F 15/40
[52] U.S. Cl. .................................................. 364/518
[58] Field of Search ............... 364/518, 521, 522, 523; 358/311

[56] References Cited

U.S. PATENT DOCUMENTS

| | | | |
|---|---|---|---|
| 4,357,624 | 11/1982 | Greenberg ...................... | 358/311 X |
| 4,719,585 | 1/1988 | Cline et al. ........................... | 364/518 |
| 4,803,643 | 2/1989 | Hickey ................................ | 364/523 |
| 4,833,625 | 5/1989 | Fisher et al. ......................... | 364/518 |

OTHER PUBLICATIONS

Word Writer ST, for ATARI 520ST and 1040ST Computers, TIMEWORKS User Manual, 1982.
R. B. K. Dewar, SPITBOL-68K Program Reference Manual, Catspaw, Inc., Salida, Colorado, Mar. 1, 1987.
R. E. Griswold et al., The SNOBOL4 Programming Language, Prentice-Hall, Inc., Englewood Cliffs, New Jersey, 1971.

Primary Examiner—Gary V. Harkcom
Assistant Examiner—Mark K. Zimmerman
Attorney, Agent, or Firm—James W. Falk; Leonard Charles Suchyta

[57] ABSTRACT

A data processing system for processing planar-oriented computer output data to provide customized output for each user. The system, called phaser, specifies two-dimensional portions of such planar-output for processing to permit page-oriented editing of the planar output. Portions of pages can be identified by column and line numbers, by box and block coordinates, and by matching plane-oriented patterns. Prior to processing, such varied page specifications are converted to segment lists of line segments to permit uniform processing. Phaser statements are compiled and executed in working sets which can be invoked in series or in parallel (on the same data input) to permit union and intersection operations.

6 Claims, 4 Drawing Sheets

METHOD AND APPARATUS FOR SELECTIVELY PROCESSING PAGINATED OUTPUT

This application is a continuation of application Ser. No. 07/257,218, filed Oct. 13, 1988, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to digital data processing and, more particularly, to the selective post-processing of paginated output from digital data processing systems.

BACKGROUND OF THE INVENTION

Many digital data processing application programs in use today produce output in the form of a sequence of two-dimensional images or planes, exemplified by the printed page or the display on a cathode ray tube. Typical examples of such application programs include word processing programs, spread-sheet programs and data base manager programs. The contents of these images include all of the information obtained from the operation of the application program, arranged or formatted in a manner believed to be useful by the application programmer. Some limited ability to control or edit these output images are sometimes included in the application package. Unfortunately, however, such alternate output formats must be provided either by laborious, line-by-line manual editing of the original output, by hard coding of the new format by the application programmer, or else a large and complex report generator must be included in the application program to allow the user to format his or her own output.

The major disadvantage of the inflexible output format is that it sometimes serves to conceal rather than reveal the desired data, due either to the sparsity of the desired data among the total data output, or due to the indirect manner in which it is displayed. The disadvantages of report generators associated with application programs are the time and difficulty in learning how to use the report generator, only to find that it is then necessary to learn a new report generator for a new and different application program. The disadvantages of manual editing are obvious.

SUMMARY OF THE INVENTION

In accordance with the illustrative embodiment of the present invention, these and other problems are solved by providing a general purpose application program output post-processor system which permits the user to selectively format, process and display portions of the data contained in a series of two-dimensional images for display or for printing. The post-processing system in accordance with the present invention (hereinafter called "phaser") is independent of the application program with which it is used and hence can be used with a wide variety of different application programs.

More specifically, the post-processing system of the present invention looks at the two-dimensional plane-oriented outputs from any application program and selectively identifies one or two-dimensional portions of those outputs either by pattern content, or by location on the page. That is, information is located either by the content of the information, or by line and character offset (column) location on the page. It should be noted that the patterns and/or the physical locations need not be contiguous. In order to permit common processing of data identified by these different locators, they are both converted to a single descriptor form, for example, lists of line segments. Such a "segment list" can then be used to control the processing of the data so identified to permit the selective display, replacement or omission of the described data. In particular, data located by pattern matching, for example, is converted to line segment location and placed on the segment list in line segment format.

The plane-oriented post-processing system of the present invention therefore can process the data identified in the segment list by deriving other data from the data identified on the segment list, or merely displaying the identified data in any desired format.

A major advantage of the output-oriented post-processing formatter of the present invention over the data-oriented, pre-processing formatters of the prior art is the ability to use the same formatter for many different application programs, from word processing programs to data base managing programs, and from spread-sheet programs to information retrieval programs.

BRIEF DESCRIPTION OF THE DRAWINGS

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figure 1:
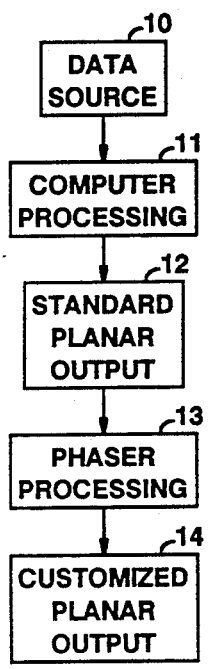
FIG. 1 shows a general block diagram of a page-oriented computer application program system showing the post-processing phaser formatter in accordance with the present invention.

In FIG. 1 there is shown a general block diagram of a computer system in which the present invention can be used. The system of FIG. 1 includes a data source 10 which supplies the data to be processed by the computer system of FIG. 1. Typically, such data sources are located on magnetic disks, usually after being assembled from large numbers of data generating stations such as point-of-sale terminals, banking terminals, business inventory control stations, and so forth. Data from source 10 is supplied to a standard computer processing system 11 which performs well-known types of computer processing steps on the data from source 10. A typical result of such processing is the generation of a plurality of "pages" of output. In this context, the term "pages"

includes successive cathode ray tube screen images, or any other two-dimensional, planar output, as well as printed pages. Such output can be categorized as standard planar output 12 from computer processing system 11. The major problem with such output, as anyone who has had to deal with it fully understands, is that the specific data the user requires is most often buried somewhere in a very large volume of data, spread over a large number of possibly non-successive pages of data, the majority of which is not of interest to that user. It is to the solution of this problem that the present invention is directed.

In accordance with the present invention, the standard planar output 12 from the computer processing system 11 is applied to a special post-processing system 13, hereinafter called the "phaser" processing system. The function of the phaser processing system 13 is to analyze the planar output from block 12, to select the portions of that output desired by the present user, to further process such selected portions, if required, and to display the results of such further processing, along with whatever portions of the original output are desired. The result of the operation of phaser processing system 13 is customized planar output 14 which includes all of the data wanted by the user, and only the data wanted by the user, reformatted and further processed in exactly the manner wanted by that user. Other users of the same standard planar output 12 can use the same phaser processing system 13 to provide another, different customized output 14 suitable for the other user's needs.

In the prior art, it was always possible for the supplier of the particular computer processing system 11 to customize the output for the imagined needs of future users, or to customize the output for a particular user, given adequate time and resources. In either case, however, the customization was "hard coded" into the application program, not thereafter readily susceptible to changes by the user. Different users, of course, required different customizations, all at significant costs in time and other resources. It is a significant advantage of the phaser processing system 13 of the present invention that the format and content of the customized planar output 14 is entirely under the control of the user.

It was also possible in the prior art for the supplier of the particular computer processing system 11 to include in the application software a more or less general purpose report generator. Such report generators had the capability of allowing the user to select the data and the format for the planar output 12, thus supplying one of the needs met by the present invention. Unfortunately, however, such report generators are at least as complex to implement as the application itself, and hence expensive to provide. Furthermore, the degree of variation permitted in formatting or data content was limited, dependent in part on the software supplier's view of the needs of the ultimate user. For example, many report generator programs simply permitted the user to display or not display the contents of specific fields in the data records, with no more sophisticated selection criteria and no further processing possible. More importantly, such report generators were specific to the applications software in which they resided. Hence, when a new application processing system 11 is used, an entirely new report generator must be provided or devised. In addition to the cost and delay time in providing such new report generators, it is typical for the new report software to require retraining of the entire user community, since the methodology and the conventions for the new report generator are normally different from other prior report generators. It is another significant advantage of the present invention that the phaser processing system 13 can be applied to the paginated, planar output from any computer processing system 11, provided only that the output is divided into pages or images on a terminal screen, that is, as long as the output is a succession of two-dimensional data arrays which can be divided into rows and columns, into lines and characters, or into any other two-dimensional coordinate identifiers.

Although general purpose report generators are available in the prior art, in order to use these report generators, the data base itself must be reformatted to the specifications of the report generator and the data base manager supplied with the report generator used to access information from the data base. The difficulty with this arrangement is the obverse of the difficulties pointed out above. That is, the data base universe has to be tailored to the particular report generator whereas, above, the report generator universe had to be tailored to the particular data base. Neither arrangement deals efficiently with the actual data base arrangements present in the real world. The major advantage of the present invention is the provision of tailored output from any data base by tailoring the user-readable output of the data base rather than the data base itself. Indeed, it is possible for the system of the present invention to convert data which is not paginated into paginated data, and hence it can be used to convert a stream of data, originally intended for electronic consumption, into a series of pages useful for human readers.

It is to be noted that the purpose of customizing the output of a particular computer processing system 11 may be to transfer the customized data on to another computer processing system rather that to present the data to the user. The phaser system of the present invention is perfectly suitable for this arrangement and, in doing so, can reduce the delay in performing such further processing to virtually zero. It should also be noted that one very important use of decimated computer processing output is in regression testing. Regression testing generally involves the comparison of the outputs from new and old versions of the same program. If they are identical, the new version is considered to be correct. In regression testing, it is undesirable to compare all of the output since the time required would be prohibitive and some portions of the output tend to be date or time dependent and hence not comparable. Regression testing is therefore the art of selecting test cases which are typical, repeatable, and cover all of the major capabilities of the system. The decimation of the output data from the new and old versions of the same program for regression testing comparisons is a major use of the phaser processing system of the present invention.

Figure 2:
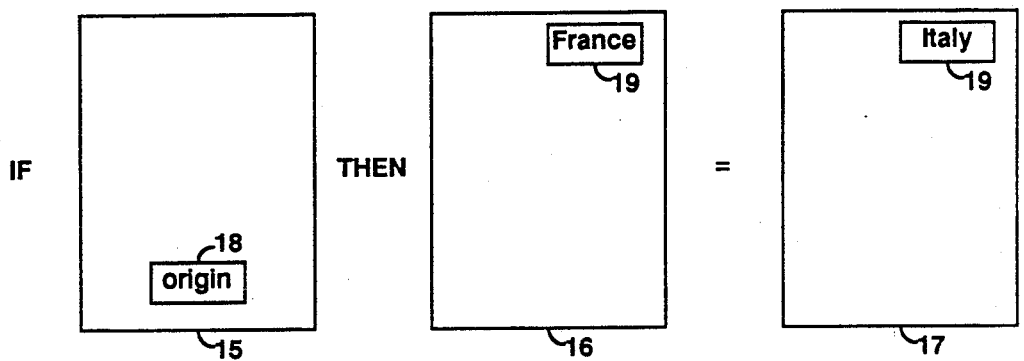
FIG. 2 shows a graphical example of the type of post-processing that can be done on paginated output using the phaser system of the present invention.

In FIG. 2 there is shown a typical example of the type of post-processing of paginated output permitted by the phaser processing system 13 of the present invention. In FIG. 2, there are shown three different views 15, 16 and 17 of the same paginated portion of the output from a computer processing system such as system 11 of FIG. 1. Page 15 shows a window 18 containing the data characters "origin" in the lower, central portion of page 15. As suggested by the text between the pages 15-7, the appearance of the characters "o-r-i-g-i-n" in window 15 causes the contents "France" of window 19 in the upper right hand corner of page 16 to be changed to "Italy" in window 19 of page 17. This type of pattern recognition and conditional pattern changing is only typical of the phaser processing system 13 of the present invention. Virtually any other type of two-dimensional processing is possible.

The general types of analysis actions available in the phaser system are replace, choose, remove and replace everything but. Combinations of these four basic actions provide virtually universal flexibility in decomposing paginated output. Similarly, the general categories of objects upon which these actions can be taken are virtually universal. Thus, the replace, choose, remove and replace everything but actions can be applied to pages, lines, columns, strings, boxes (like windows 19 in FIG. 2), blocks (lists of strings, not necessarily contiguous), and "clouds" (entire pages treated as one continuous string for SPITBOL ® pattern searches). SPITBOL patterns are described, for example, in SPITBOL-68K Program Reference Manual, by R. B. K. Dewar, Catspaw, Inc., Salida, Colo., 1987. SPITBOL is a dialect of the SNOBOL language, described in The SNOBOL4 Programming Language, R. E. Griswold et al., Prentice-Hall, Englewood Cliffs, N.J., 2nd Ed., 1971. The pages of information thus decomposed by the replace, choose, remove and replace everything but actions can be recomposed however the user wishes by the merge action which recombines the decomposed elements into new pages with new formats.

Figure 3:
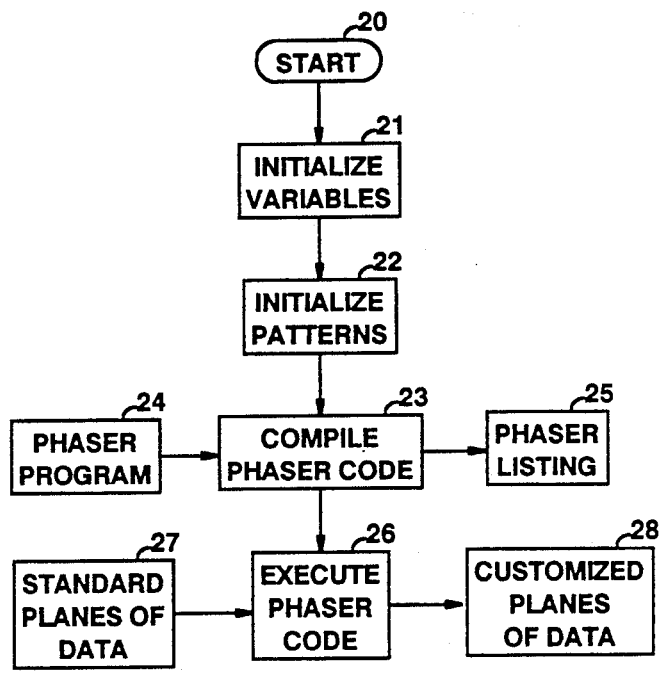
FIG. 3 shows a more detailed block diagram of the phaser post-processing page-oriented processing system in accordance with the present invention.

In operation, the user of the phaser system of the present invention describes the post-processing desired by a sequence of statements involving the actions and objects described above. These statements make up a phaser program and are used by the phaser system as described in connection with FIG. 3. Turning then to FIG. 3, there is shown a flowchart of the phaser processing system 13 of FIG. 1. The process of FIG. 3 starts in start box 20. In box 21, most of the variables used in the phaser system of FIG. 3 are initialized. Similarly, in box 22, most of the patterns used in the phaser system are initialized. The phaser program 24 consists of a number of statements involving actions and objects as described above. In box 23, the phaser program is compiled and a phaser listing 25 produced for assistance in trouble shooting. The phaser program compiled in box 23 is executed in box 26 to translate the standard planes of data 27 into the customized planes of data 28, all in accordance with the user's wishes as expressed in phaser program 24.

The phaser program 24 of FIG. 3 is typically divided up into a number of working sets, each working set defining the processing steps to be carried out on one set of input data to produce one particular data output. A phaser program can include any number of such working sets, each working set working on a different data input set, or providing different processing steps for the same input data. The basic phaser statement types are defined below, where <argument> is a variable name, where capital letters identify the predefined actions, where "objects" are as defined above, and where square brackets around an argument indicate that the argument is optional:

1. define <working set name> using <using group>. This statement is used to mark the beginning of a working set. The working set name is the unique name of this working set. The using group in the using clause is a list of the inputs to this working set, including filenames (in parentheses) or set names of other working sets.
2. end <working set name>. This statement is used to mark the end a working set.
3. choose <object1> [where <object2> <contain phrase> <pattern>]. The current text set will be modified to include only the <object1> portion of the input text if the <object2> portion of the input text meets the specifications of the where clause.
4. remove <object1> [where <object2> <contain phrase> <pattern>]. The current text set will be modified so that it will not include the <object1> portion of the input text if the <object2> portion of the input text meets the specifications of the where clause.
5. replace <object1> with <string> [where <object2> <contain phrase> <pattern>]. The current text set will have the <object1> portion of the input text replaced with repetitions of the with string only if, and only if, the <object2> portion of the input text meets the specifications of the where clause.
6. replace everything but <object1> with <string> [where <object2> <contain phrase> <pattern>]. The current text set will have everything in the input text set but the <object1> portion of the input text replaced with the with string if, and only if, the <object2> portion of the input text meets the specifications of the where clause.
7. merge <mergetype> <mergeobject1> <mergeobject2>. Merge successive pairs of plane objects (pages from files or from working sets) side-by-side, one-after-another or line-by-line (mergetypes). Plane objects may be the current working set plane contents, a plane read from a file, or a remembered plane.
8. pad on the <direction> with <number> <string>. Add <number> copies of <string> on the <direction> side of the current working set plane. The direction is right or left.
9. remember as <name>. Save a copy of the contents of the current working set plane for later retrieval under the key <name>.
10. translate from <string1> to <string2>. Replace single character in <string1> with single characters in <string2>. This could be done with replace, but not as efficiently.
11. write <string> to <filename>. Store a literal string in a file.
12. print to <filename>. Print the contents of the current working set to <filename>.

The "objects" of the above action statements can be any one or two-dimensional regions on an input plane, not necessarily contiguous. Such regions can be defined in terms of page numbers for groups of pages, line numbers, ranges or patterns for groups of lines, column numbers, ranges or patterns for groups of columns, coordinates or patterns for strings, and coordinates or patterns for a rectangular box. Other definitions of regions include "clouds" defined by patterns and "blocks" defined by lists of line segments. These relationships between the actions and the regions will be discussed in connection with a discussion of the syntax diagrams of FIGS. 4A and 4B.

Figure 4A:
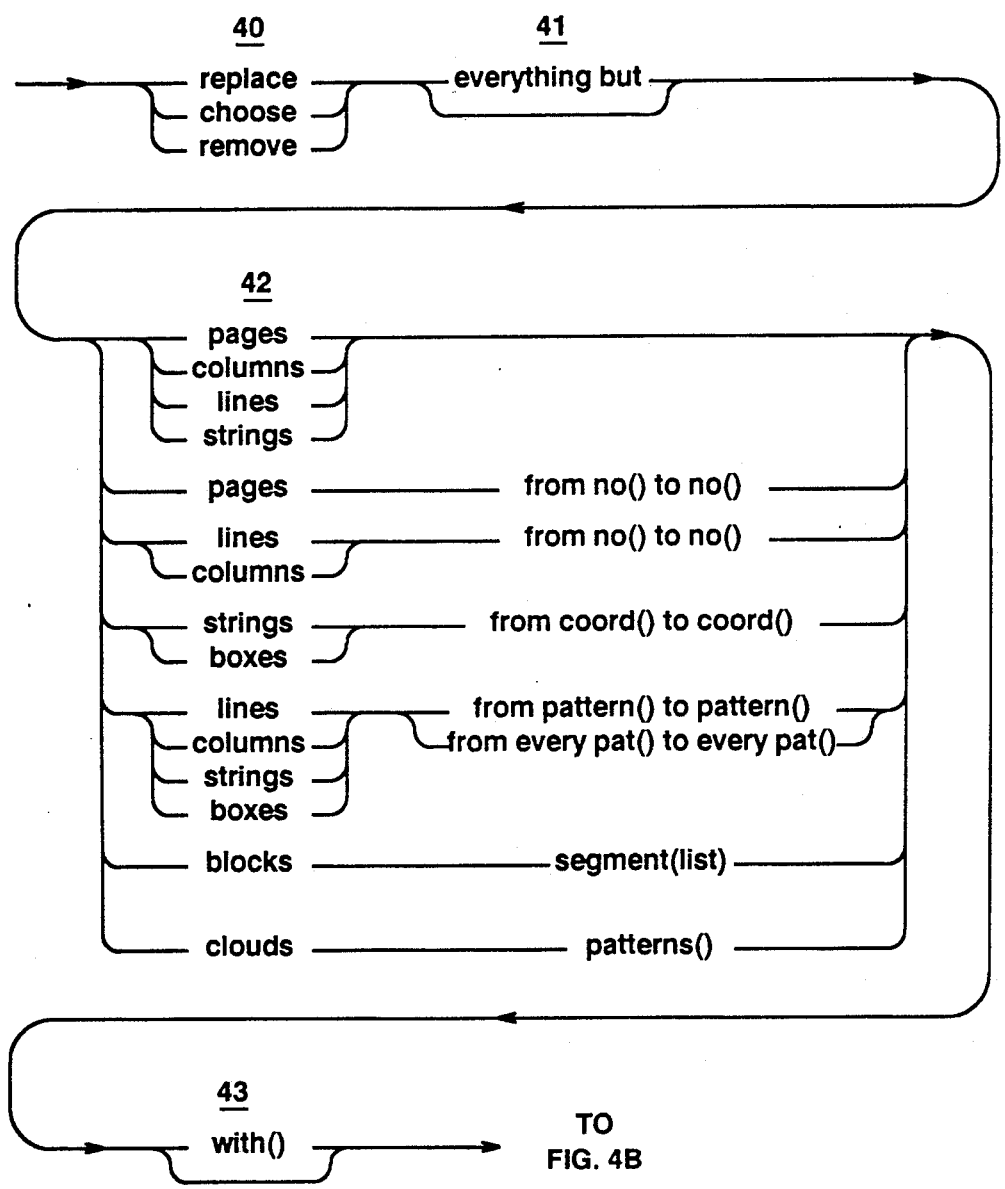
FIGS. 4A and 4B show graphical representations of the syntax diagram for a compilation procedure that can be utilized in the phaser system of the present invention.

Before turning to FIG. 4A, it should be noted that a phaser statement is a section of source code beginning with one of the action words identified above (define, end, replace, choose, remove, etc.) and ending with a semicolon. A phaser working set is a plurality of phaser statements introduced by a define statement and terminated by an end statement. A phaser program is one or more working sets. Note that the input to a working set can be the output of one or more other working sets as well as the contents of one or more data files. By processing working sets in a user-defined order, the phaser system is able to perform logical unions and intersections of the working set parameters. That is, sequential working sets are ANDed and parallel working sets are ORed.

Figure 4B:
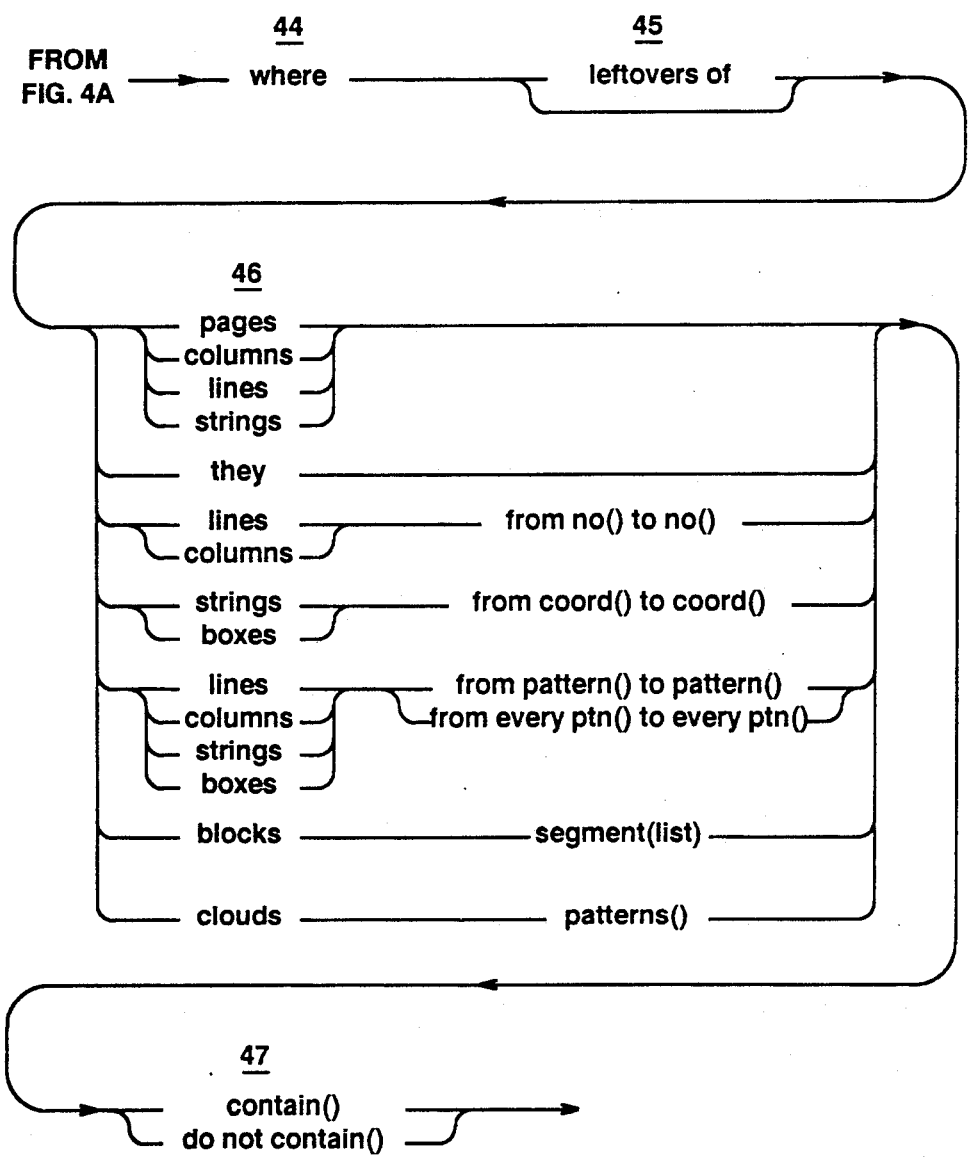

With the above as a background, the syntax diagram of FIGS. 4A and 4B can now be considered. The syntax diagrams of FIGS. 4A-4B are so-called "railroad" diagrams. In these diagrams, movement takes place through the diagram from left to right and various branches can be entered as if railroad switches were operated to permit access to that branch. The direction of the branch curves suggests the unidirectional nature of the branching.

In FIG. 4A, the action words of the working set statements are found at reference numeral 40 while the objects affected by these actions and their respective position specifications are found at reference numeral 41. Note that all possible combinations of actions, objects and position specifications are accounted for in the syntax diagram. At reference numeral 42, the replacement value is available for the replace statements. In FIG. 4B, the conditional where clauses are taken care of at reference numeral 43 with the objects and position specification named in the WHERE clause appearing at reference numeral 44. Finally, at reference numeral 45, the text comparison patterns are accounted for. Using the syntax diagram of FIGS. 4A and 4B, the generation of a compiler for phaser statements is straightforward and obvious to persons skilled in the compiler art.

It will be noted that the phaser system allows two-dimensional objects in the planar output of a computer processing system to be described in a wide variety of ways: page numbers, column and line numbers, patterns in strings, boxes, blocks and clouds, and so forth. In order to process the contents of such objects, it is essential to provide a common representation of the information location in the planar output, regardless of how such information was described by the user. The common representation used in the phaser system is called the "segment list." A segment list is a list composed of all of the line segments making up the data identification of an object and its descriptors. Such segment lists are composed of items which take the form:

(a, b-c)

where a is the line number in which the line segment is located, b is the starting column number of the line segment and c is the ending column number of the line segment. The asterisk ("*") is used as a wild card value in segment list items to simplify representations. Thus, "(*, b-c)" represents the segments between columns b and c for all lines, "(a, b-*)" represents the segment on line a from column b to the end of the line, and "(*, 1—*)" represents an entire page. Data in the planar output of a computer processing system is located in terms of all of the locators described above, including pattern matching. Once located, however, all information specifications internal to the phaser system are kept in the form of segment lists and passed between processes in this form. It is therefore unnecessary to provide special processing routines for all of the different forms of data identifiers available in the system (FIGS. 4A-4B). All internal processing is done on segment lists, and all data representations are converted to and from the segment list representation whenever any processing is necessary. Some regions translate directly into segment list notation (lines and columns), but some can be translated to segment list notation only after the data is identified, e.g., by pattern matching.

Since segment list items can arise from a variety of phaser statements, it is possible for various items to include portions of overlapping segments. While the system would operate properly with such overlapping items, the processing would be less than optimum since certain segments would be treated more than once. In order to eliminate such multiple processing, each segment list, just prior to processing, is sorted, duplicate segments eliminated and overlapping segments combined into a single segment. A simple comparison of line numbers and column numbers readily permits such segment list optimization.

The phaser system represented in block form in FIG. 3 can also be represented by the following pseudo-code in Table I:

TABLE I

```
main ( )
        define variables
        define patterns
        parsegen ( )
                while input
                getstat ( )
                        read statement
                        if defset
                                then
                                        start workingset code
                                end then
                        else if endset
                                then
                                        terminate workingset code
                                end then
                        else if intersperse merge
                                then
                                        buildintersperse
                                end then
                        else if action statement
                                then
                                        buildcode
                                end then
                        else if merge statement
                                then
                                        buildmerge
                                end then
                        end else
                end getstat
        end parsegen
        process ( )
                if no endset
                        then
                                add endset
                        end then
                end if
                fileroutine ( )
                        while no NULL
                                readpage ( )
                                rout (workingsets)
                        end while
                end fileroutine
        end process
end main
```

The define routines create all of the fixed variables and fixed patterns to be used in the balance of the program. The parsegen routine is the compiler, using the syntax of FIGS. 4A and 4B, to create executable code from the phaser statements. For example, getstat gets the next phaser statement (terminated by a semicolon). The defset routine sets up the data structures specified as input and the working set-data structure control structures necessary to identify and eventually execute each working set against the appropriate data structures. The buildcode, buildmerge and buildintersperse routines create the actual executable code for the action statements, merge statements and intersperse statements, respectively. The endset routine terminates the working set and triggers the actual compilation of the working set code.

In TABLE I, the process routine actually executes the compiled phaser executable code. First, the endset routine is called in case the final END statement is missing. The fileroutine routine loops through the input files identified in the define statements (up to an end-of-file, EOF), passing the input planes of data, one by one, on to the rout routine. The rout routine finds each working set which specifies this file in its using clause, and executes the compiled working set against that plane. The rout routine also finds the working sets which must follow other working sets (in accordance with the using clause of the define statements) and insures proper ordering of the execution of the working sets. Execution of the working set code continues until the input has been exhausted and all planes have been processed. SPITBOL code descriptions of each of these routines can be found in the Appendix to this application.

An illustrative example of a phaser user program will be given to aid in the understanding of the present invention. It is to be understood that this example is illustrative only, and should not be treated as limiting in any sense. Indeed, the illustrative example was chosen to be relatively simple to aid in the understanding of the invention. The following phaser program is illustrative:

TABLE II

```
define a using (file1);
        remove pages where they contain 'xyz';
define b using a;
        remove pages where they contain 'abc';
end b;
define c using a;
        remove pages where they contain '111';
end c;
define d using b, c;
        replace strings with 'xyz' where they contain 'kag';
        print to (outfile);
end d;
```

Figure 5:
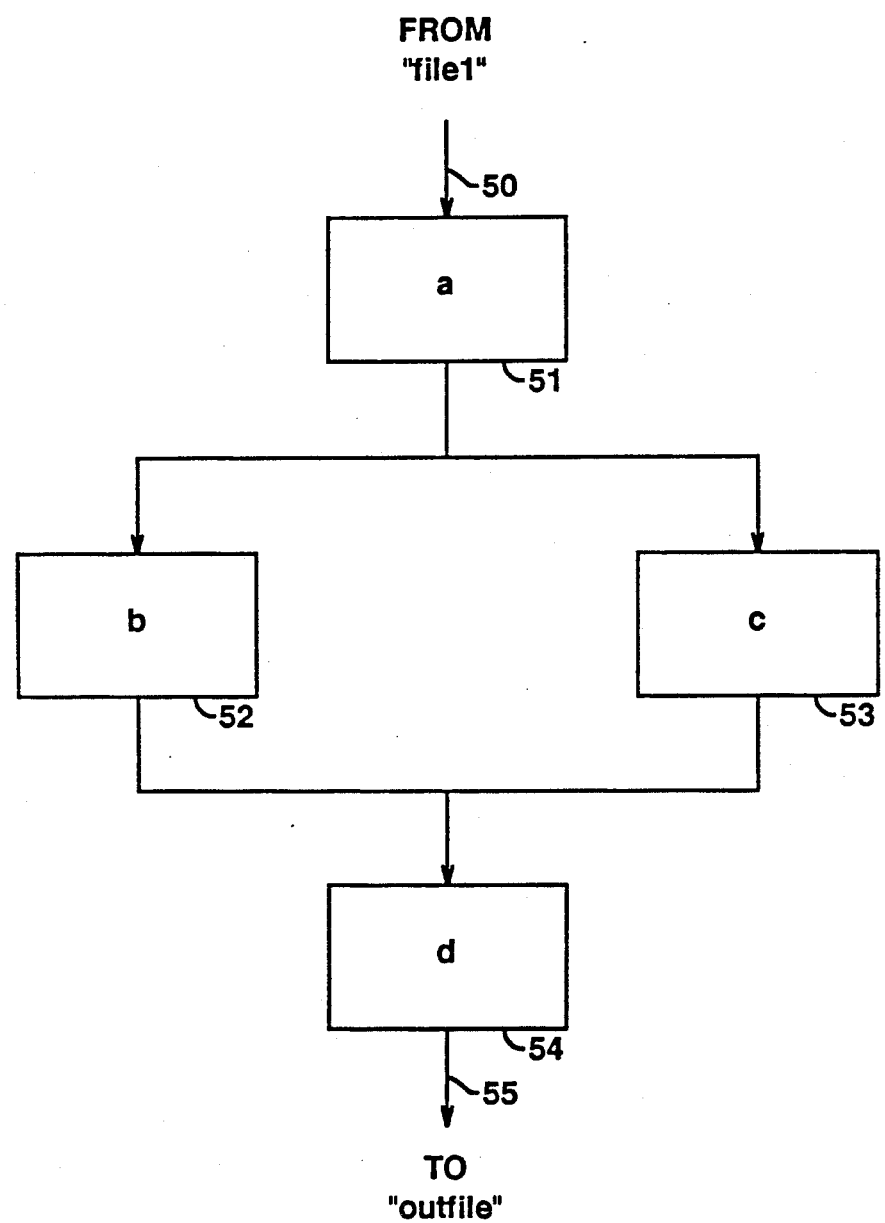
FIG. 5 shows a flowchart of an illustrative phaser procedure showing the ordering of working set routines.

The result of compiling and executing the phaser program of TABLE II is shown graphically in FIG. 5. Each box in FIG. 5 represents a working set. Thus the contents of "file1" are operated on (by way of line 50) by working set 51, identified as working set "a." The output of working set 51 is routed to both working set 52 ("b") and working set 53 ("c"). The outputs of working sets 52 and 53 are both routed to the input to working set 54 ("d"). Thus, the output of working set 54 on leads 55 is the ORed combination of working sets 52 and 53, subject to (ANDed with) the post-ORing operations of working set d. It is clear that any other Boolean combination of operations can be performed on the input data simply by appropriately specifying the working set inputs. In this sense, phaser applies a very large grain data flow (one plane at a time) to the editing of collections of plane-oriented output. Moreover, the phaser commands exploit the two-dimensional aspects of the planar output to transform two-dimensional arrays or patterns of alphanumeric data by filtering each page-sized plane through a virtually arbitrarily prescribed network of plane-oriented filters.

It should be clear to those skilled in the art that further embodiments of the present invention may be made by those skilled in the art without departing from the teachings of the present invention.

APPENDIX

```
-LIST
*
*       COPYRIGHT (C) 1988 BELL COMMUNICATIONS RESEARCH
*               ALL RIGHTS RESERVED
*
*
        -TITLE      PHASER
*
*
        -STITL      ALLSEGSFROMPT

DEFINE('ALLSEGSFROMPT(SHAPE,PAGE)TSHAP,P1,P2,CNT,C3,'
    +   'C1,CNT2,C2,TEMP1,HEAD,CURRENT,GREATER,TONEWLIST,LESS,'
    +   'OLDHEAD2')
    +       :(ENDALLSEGSFROMPT)
```

```
     ALLSEGSFROMPT
        MATCH(EPATPAT,SHAPE)  :F(BADSHAPEINALLSEGS)
        P1 = EVAL(P1)
        P2 = EVAL(P2)
        &ANCHOR = 0
        HEAD = SEGMENT(0,0,0)
        CURRENT = HEAD
        C3 = 0
        CNT = 1
     ALLLSFP  (?(PAGE< CNT> ) DIFFER(PAGE< CNT> ,BOL)) :S(HIRETURN)
        PAGE< CNT> @C1 P1 *GT(C1,C3) :S(ALLFOUNDBEGIN)

CNT = CNT + 1 :(ALLLSFP)
     ALLFOUNDBEGIN
        CNT2 = CNT
        PAGE< CNT> P2 @C2 *GT(C2,C1) :S(ALLFOUNDEND)
        CNT2 = CNT2 + 1
     ALLLSFP2
        (?(PAGE< CNT2> ) DIFFER(PAGE< CNT2> ,BOL)) :S(HIRETURN)
        PAGE< CNT2> P2 @C2 :S(ALLFOUNDEND)
        CNT2 = CNT2 + 1 :(ALLLSFP2)
     ALLFOUNDEND
        IDENT(TSHAP,'LINES')  :F(HISTR)
        TEMP1 = CNT
     HI1  LE(TEMP1,CNT2) :F(NEXTMATCHPREP)
        NEXT(CURRENT) = SEGMENT(TEMP1,1,'*')
        CURRENT = NEXT(CURRENT)
        TEMP1 = TEMP1 + 1 :(HI1)
     HISTR  IDENT(TSHAP,'STRINGS')  :F(HIBOX)
        NEXT(CURRENT) = SEGMENT(CNT,C1 + 1,C2)
        CURRENT = NEXT(CURRENT) :(NEXTMATCHPREP)
     HIBOX  IDENT(TSHAP,'BOXES') :F(HICOL)
        TEMP1 = CNT
     HI2  LE(TEMP1,CNT2) :F(NEXTMATCHPREP)
        NEXT(CURRENT) = SEGMENT(TEMP1,C1 + 1,C2)
        CURRENT = NEXT(CURRENT)
        TEMP1 = TEMP1 + 1 :(HI2)
     HICOL  IDENT(TSHAP,'COLUMNS') :F(BADSHAPEINALLSEGS)
        NEXT(CURRENT) = SEGMENT('*',C1 + 1,C2)
        CURRENT = NEXT(CURRENT)
     NEXTMATCHPREP
        CNT = CNT2
        C3 = 0
        PAGE< CNT>  @C1 P1 *GT(C1,C2) :S(ALLFOUNDBEGIN)
        CNT = CNT + 1 :(ALLLSFP)
     HIRETURN
        ALLSEGSFROMPT = DIFFER(TSHAP,'COLUMNS') NEXT(HEAD)
     +   :S(RETURN)
        HEAD = NEXT(HEAD)
     ALLSORDIT
        TONEWLIST = SEGMENT(0,0,0,HEAD)
        HEAD = DIFFER(NEXT(HEAD),NULL) NEXT(HEAD)
     +   :F(ALLSTRIPHEAD)
        NEXT(NEXT(TONEWLIST)) = NULL
     ALLLOOOP1
        LESS = TONEWLIST
        GREATER = NEXT(TONEWLIST)
```

```
    ALLLOOOP
         IDENT(GREATER,NULL) :S(ALLINSERT)
         LT(START(HEAD),START(GREATER)) :S(ALLINSERT)
         LESS = GREATER
         GREATER = NEXT(GREATER) :(ALLLOOOP)
    ALLINSERT
         OLDHEAD2 = HEAD
         HEAD = NEXT(HEAD)
         DIFFER(GREATER,NULL) EQ(START(OLDHEAD2),START(GREATER))
    +        START(GREATER)),IDENT(FINISH(OLDHEAD2),FINISH(GREATER))
    +        :S(ALLSEND)
         NEXT(LESS) = OLDHEAD2
         NEXT(OLDHEAD2) = GREATER
    ALLSEND IDENT(HEAD,NULL) :F(ALLLOOOP1)
    ALLSTRIPHEAD
         TONEWLIST = NEXT(TONEWLIST)
         ALLSEGSFROMPT = TONEWLIST    :(RETURN)
    ENDALLSEGSFROMPT

-STITL       BUILDCODE

DEFINE('BUILDCODE(WS,VRB,SH1,EVB,SH2,WTH,CNT,PTT)'
    +       'TVRB,BASE,RNGFROM,RNGTO,SAVE1,SAVE2,CLOUDPAT2
    +       CLOUDPAT') :(ENDBUILDCODE)
    BUILDCODE
    *       IF SHAPE2 = 'THEY' THEN SHAPE2 = SHAPE1
            SH2 = IDENT(SH2,'THEY') SH1
    *       IF VRB = 'REPLACE-EVERYTHING BUT' THEN VRB = REB
            VRB = MATCH(BTN 'REPLACE' BT 'EVERYTHING' BT 'BUT',VRB)
    +       'REB'
    *       IF VRB IS 'TRANSFORM EVERYTHING BUT' THEN VRB = 'TEB'
            VRB = MATCH(BTN 'TRANSFORM' BT 'EVERYTHING' BT 'BUT'
    +       VRB) 'TEB'
            OUTLISTING = DIFFER(VRB,'TRANSFORM') DIFFER(VRB,'TEB')
    +       OUTLISTING_ERROR "TRANSFORM NOT FULLY SUPPORTED YET"
    *       IF SHAPE1 IS A SINGLE PATTERN BUT NOT A CLOUD
            BASE = MATCH(PATPAT,SH1)
    +            'MUSHBYSEGS('" VRB '";' WTH
    +            ',PAGE,OPTM(SEGSFROMPT('" SH1 '",PAGE)))' :S(TWO)

*       IF SHAPE1 IS AN EVERY PATTERN BUT NOT A CLOUD
            BASE = MATCH(EPATPAT,SH1)
    +            'MUSHBYSEGS('" VRB '";' WTH
    +            ',PAGE,OPTM(ALLSEGSFROMPT('" SH1 '",PAGE)))'
    +            :S(TWO)

*       IF SHAPE1 IS A CLOUD
            BASE = MATCH(CPATPAT,SH1)
    +            'MUSHCLOUD('" VRB '";' WTH ',PAGE,'
    +            CLOUDPAT ')'                :S(TWO)

*       IF SHAPE1 IS A PAGE RANGE
            BASE = MATCH(PAGERNGPAT,SH1)
    +            'MUSHRANGE('" VRB '";' WTH ',PAGE,'
    +            RNGFROM ',' RNGTO ')'  :S(RETBASE)
```

```
     *     IF SHAPE1 IS DEFERRED, AND SHAPE2 = SHAPE1 OR SHAPE1
     *     DEALS WITH A WHOLE MESSAGE/PAGE/SCREEN
           BASE = MATCH(DEFERPAT RPOS(0),SH1)  (IDENT(SH1,SH2)
     +           MATCH(DEFERPAGEPAT,SH1))
     +           'MUSHWHOLEPAGE('" VRB "',' WTH ',PAGE)' :S(TWO)
     *     IF SHAPE1 IS DEFERRED, SHAPE2= SHAPE1,
     *     VRB = REB AND VRB = TEB AND CONTAINS
           BASE = MATCH(DEFERPAT RPOS(0),SH1) IDENT(SH1,SH2)
     +      IDENT(CNT,'CONTAIN') DIFFER(VRB,'REB') DIFFER(VRB,'TEB')
     +     'MUSHBYSEGS('" VRB "',' WTH
     +         ',PAGE,OPTM(SHAPESFROMSEGS('" SH1 "','
     +         'FINDOCCURSEGS('
     +         PTT ',PAGE))))'   :S(RETBASE)
     *     IF SHAPE1 IS DEFERRED, SHAPE2= SHAPE1
     *     VRB = REB AND CONTAINS
           BASE = MATCH(DEFERPAT RPOS(0),SH1) IDENT(SH1,SH2)
     +      IDENT(CNT,'CONTAIN') IDENT(VRB,'REB')
     +         'MUSHBYSEGS("REPLACE",' WTH
     +         ',PAGE,NOTSEGS(OPTM(SHAPESFROMSEGS('" SH1 "','
     +         'FINDOCCURSEGS('
     +         PTT ',PAGE)))))'   :S(RETBASE)
     *     IF SHAPE1 IS DEFERRED, SHAPE2= SHAPE1
     *     VRB = TEB AND CONTAINS
           BASE = MATCH(DEFERPAT RPOS(0),SH1) IDENT(SH1,SH2)
     +      IDENT(CNT,'CONTAIN') IDENT(VRB,'TEB')
     +         'MUSHBYSEGS("TRANSLATE",' WTH
     +         ',PAGE,NOTSEGS(OPTM(SHAPESFROMSEGS('" SH1 "','
     +         'FINDOCCURSEGS('
     +         PTT ',PAGE)))))'   :S(RETBASE)
     *     IF SHAPE1 IS DEFERRED, SHAPE2= SHAPE1,
     *     CONT IS NOT CONTAINS AND VERB IS NOT REPLACE
           BASE = MATCH(DEFERPAT RPOS(0),SH1) IDENT(SH1,SH2)
     +      DIFFER(CNT,'CONTAIN') DIFFER(VRB,'REPLACE')
     +         'MUSHBYSEGS('" OPPVRB< VRB> "',' WTH
     +         ',PAGE,OPTM(SHAPESFROMSEGS('" SH1
     +         "',FINDOCCURSEGS('
     +         PTT ',PAGE))))'   :S(RETBASE)

     *     IF SHAPE1 IS DEFERRED, SHAPE2= SHAPE1,
     *     CONT IS NOT CONTAINS AND VERB IS REPLACE
           BASE = MATCH(DEFERPAT RPOS(0),SH1) IDENT(SH1,SH2)
     +      DIFFER(CNT,'CONTAIN') IDENT(VRB,'REPLACE')
     +         'MUSHBYSEGS("REPLACE",' WTH
     +         ',PAGE,NOTSEGS('
     +         'OPTM(SHAPESFROMSEGS('" SH1
     +         "',FINDOCCURSEGS(' PTT ',PAGE)))))'   :S(RETBASE)
     *     IF SHAPE1 IS SEGMENTED
           SEGTAB< 'SEG' LABCNT > = DIFFER(VRB,'REB') DIFFER(VRB
     +     'TEB'), OPTM(FINDSEGLIST(SH1)) :S(ONEO)
           SEGTAB< 'SEG' LABCNT > =
     +         NOTSEGS(OPTM(FINDSEGLIST(SH1)))
     ONEO  TVRB = VRB
           TVRB = IDENT(VRB,'REB') 'REPLACE'
           TVRB = IDENT(VRB,'TEB') 'TRANSFORM'
```

```
            BASE =
     +         'MUSHBYSEGS('" TVRB '";' WTH
     +         ',PAGE,SEGTAB< "SEG' LABCNT '"> )'
            LABCNT = LABCNT + 1
     *                          :(TWO)
     TWO
      *    IF SHAPE2 IS NULL
            IDENT(SH2,NULL)       :S(RETBASE)

*    IF SHAPE2 IS A SINGLE PATTERN BUT NOT A CLOUD
            BASE = DIFFER(EVB,NULL)
     +          MATCH(PATPAT,SH2)
     +          'MATCHSEGS(' PTT ',NOTSEGS(OPTM(SEGSFROMPT('"
     +          SH2 '",PAGE))),PAGE)' NC BASE    :S(THREE)

BASE = MATCH(PATPAT,SH2)
     +          'MATCHSEGS(' PTT ',OPTM(SEGSFROMPT('"
     +          SH2 '",PAGE)),PAGE)' NC BASE     :S(THREE)

*    IF SHAPE2 IS AN EVERY PATTERN BUT NOT A CLOUD
            BASE = DIFFER(EVB,NULL)
     +        MATCH(EPATPAT,SH2)
     +          'MATCHSEGS(' PTT ',NOTSEGS(OPTM(ALLSEGSFROMPT('"
     +          SH2 '",PAGE))),PAGE)' NC BASE    :S(THREE)

BASE = MATCH(EPATPAT,SH2)
     +          'MATCHSEGS(' PTT ',OPTM(ALLSEGSFROMPT('"
     +          SH2 '",PAGE)),PAGE)' NC BASE     :S(THREE)

*    IF SHAPE2 IS A CLOUD
            BASE = DIFFER(EVB,NULL)
     +        MATCH(CPATPAT,SH2)
     +          'MATCH(' PTT ',GRABNOTCLOUD(PAGE,'
     +          CLOUDPAT ')' NC BASE     :S(THREE)

BASE = MATCH(CPATPAT,SH2)
     +          'MATCH(' PTT ',GRABCLOUD(PAGE,'
     +          CLOUDPAT ')' NC BASE     :S(THREE)

     *    IF SHAPE2 IS DEFERRED
            BASE = MATCH(DEFERPAT RPOS(0),SH2)
     +          'MATCHWHOLEPAGE(' PTT ',PAGE)' NC BASE :S(THREE)

*    IF SHAPE2 IS SEGMENTED
              SEGTAB< 'SEG' LABCNT > =
     +        DIFFER(EVB,NULL)
     +        NOTSEGS(OPTM(FINDSEGLIST(SH2))) :S(TWOAS)
            SEGTAB< 'SEG' LABCNT > = OPTM(FINDSEGLIST(SH2))
     TWOAS    BASE = 'MATCHSEGS(' PTT ',SEGTAB< "SEG'
     +          LABCNT '">,PAGE)' NC BASE
            LABCNT = LABCNT + 1
      *                              :S(THREE)
     THREE
            BASE = IDENT(CNT,'CONTAIN') REPLACE(BASE,NC,' ')
     +                    :S(RETBASE)
```

```
        BASE BREAK(NC) . SAVE1 NC REM . SAVE2
        BASE = ' (' SAVE1 ') ' SAVE2          :S(RETBASE)
    RETBASE
   *    OUTPUT = ' BASE= ' BASE
        NONCOMP< WS> = IDENT(OTHERWISEOPT,'NONSTANDARD')
   +    NONCOMP< WS>
   +    ' PAGE = NOTNULLPG(PAGE) ' BASE ';' :S(RETURN)
        NONCOMP< WS> = DIFFER(VRB,'CHOOSE') DIFFER(VRB,'REB')
   +       DIFFER(VRB,'TEB') NONCOMP< WS>
   +    ' PAGE = NOTNULLPG(PAGE) ' BASE ';' :S(RETURN)
        NONCOMP< WS> = IDENT(VRB,'CHOOSE') NONCOMP< WS>
   +    ' PAGE = NOTNULLPG(PAGE) ' BASE ' :S(GENLAB' LABCNT
   +    ') ; PAGE< 1> = BOL ;GENLAB' LABCNT';'    :S(YRETURN)
        NONCOMP< WS> = IDENT(VRB,'REB')
   +       NONCOMP< WS> ' PAGE = NOTNULLPG(PAGE) '
   +       BASE ' :S(GENLAB' LABCNT ') ; PAGE = NOTNULLPG(PAGE) '
   +       'MUSHWHOLEPAGE("REPLACE",' WTH ',PAGE) ;GENLAB'
   +       LABCNT';'                :S(YRETURN)
        NONCOMP< WS> = NONCOMP< WS> ' PAGE = NOTNULLPG(PAGE) '
   +       BASE ' :S(GENLAB' LABCNT ') ; PAGE = NOTNULLPG(PAGE) '
   +       'MUSHWHOLEPAGE("TRANSFORM",' WTH ',PAGE) ;GENLAB'
   +       LABCNT';'
    YRETURN LABCNT = LABCNT + 1    :(RETURN)
    ENDBUILDCODE

-STTTL    BUILDMERGE - BUILDMERGE.S

DEFINE('BUILDMERGE(WS,TYPE,OBJ1,OBJ2,MEMP)NEWOBJ1
   +    NEWOBJ2,' 'EMPTYCLAUSE,NEWNAME1,NEWNAME2')
   +       :(END_BUILDMERGE)
    BUILDMERGE
   +    EMPTYCLAUSE = DIFFER(MEMP) ' NOTNULLPG(PAGE) '
        NEWOBJ1 = IDENT(OBJ1,'*') "COPY(PAGE)"
   +       :S(BLDMRG2_BUILDMERGE)
        OBJ1 "(" BTN NAME . NEWNAME1 BTN ")"
   +       :F(BLDMRG1_BUILDMERGE)
        NEWOBJ1 = "READORNULL(" NEWNAME1 ")"
        IDENT(NONUSINGINS< NEWNAME1> ,NULL)
   +       :F(BLDMRG2_BUILDMERGE)
        NONUSINGINS< NEWNAME1> = "MERGE"
        PAGETAB< NEWNAME1> = COPY(NULLARRAY)
        OPENIN(NEWNAME1)            :(BLDMRG2_BUILDMERGE)

BLDMRG1_BUILDMERGE
   +    OBJ1 NAME . NEWNAME1
        NEWOBJ1 = 'COPY(REMEMBERY< '" NEWNAME1 '"> )'
    BLDMRG2_BUILDMERGE
   +    NEWOBJ2 = IDENT(OBJ2,'*') "COPY(PAGE)"
   +       :S(BLDMRG4_BUILDMERGE)
        OBJ2 "(" BTN NAME . NEWNAME2 BTN ")"
   +       :F(BLDMRG3_BUILDMERGE)
        NEWOBJ2 = "READORNULL(" NEWNAME2 ")"
        IDENT(NONUSINGINS< NEWNAME2> ,NULL)
   +       :F(BLDMRG4_BUILDMERGE)
        NONUSINGINS< NEWNAME2> = "MERGE"
        PAGETAB< NEWNAME2> = COPY(NULLARRAY)
        OPENIN(NEWNAME2)            :(BLDMRG4_BUILDMERGE)
```

```
     BLDMRG3_BUILDMERGE
   +    OBJ2 NAME . NEWNAME2
        NEWOBJ2 = 'COPY(REMEMBERY<'" NEWNAME2 "'> )'
   BLDMRG4_BUILDMERGE
   +    NONCOMP< WS> = MATCH(LMERGE,TYPE)
   +       NONCOMP< WS> ' PAGE = ' EMPTYCLAUSE
   +         ' MRGLINEBYLINE(' NEWOBJ1 ',' NEWOBJ2 ');'
   +                          :S(RETURN)
        NONCOMP< WS> = MATCH(SMERGE,TYPE)
   +       NONCOMP< WS> ' PAGE = ' EMPTYCLAUSE
   +         ' MRGSIDEBYSIDE(' NEWOBJ1 ',' NEWOBJ2 ');'
   +                          :S(RETURN)
        NONCOMP< WS> = MATCH(OMERGE,TYPE)
   +       NONCOMP< WS> ' PAGE = ' EMPTYCLAUSE
   +         ' MRGONEAFTER(' NEWOBJ1 ',' NEWOBJ2 ');'
   +                          :S(RETURN)
        OUTLISTING = OUTLISTING_ERROR 'BAD TYPE IN BUILDMRG'
   +           :(END)
     END_BUILDMERGE

-STITL    BUILDINTERSPERSE

DEFINE('BUILDINTERSPERSE(INDD,OUTDD,KEY,KEY2,TYPE,INAME,'
   +    'INAME,WS,REVERSED)')
   +         :(ENDBUILDINTERSPERSE)
     BUILDINTERSPERSE
     *   FOR HOLDPAGE
        NONCOMP< WS> = NONCOMP< WS> 'GENLAB' LABCNT ' INTERSPERSE('"
   +    INTERSPERSE('",INAME '",PAGE,GETINTERPAGE('" INDD '"),
   +      '" OUTDD '","' KEY
   +    '","' KEY2 '","' TYPE '","' REVERSED '") :F(GENLAB' LABCNT
   +    ');'
        LABCNT = LABCNT + 1 :(RETURN)
     ENDBUILDINTERSPERSE

   -STITL    COMPAIRE

DEFINE('COMPAIRE(NEW,OLD,DIFFDD,CNAME)CNT,HEAD,CURRENT,'
   +    'SIGGY,ARY')
   +         :(ENDCOMPAIRE)
     COMPAIRE
        LT(COMPAIRETAB< CNAME> ,MAXCOMPARES) :F(RETURN)
     * SET HEAD TO POINT TO A NULL ELEMENT
        HEAD = DIFFLINES(0,NULL)
        CNT = 0
     * SET CURRENT TO HEAD
        CURRENT = HEAD
     *   ASSUMES ARRAYS ARE THE SAME SIZE
     YUCKLOOP
     * ARE WE OUT OF LINES, IE SO PRINT
        (NEW< CNT + 1> ) (OLD< CNT + 1> ) :S(YUCKPRINT)
     * IF WE ARE OUT OF EITHER PRINT
        (NEW< CNT + 1> ) :S(YOLDONLY)
        (OLD< CNT + 1> ) :S(YNEWONLY)
        CNT = CNT + 1
     * ARE WE AT BOTH ENDS, IF SO PRINT
```

```
           IDENT(NEW<CNT>,BOL) IDENT(OLD<CNT>,BOL) :S(YUCKPRINT)
      * ARE WE AT EITHER END, IF SO PRINT
            IDENT(NEW<CNT>,BOL)    :S(YOLDONLY)
            IDENT(OLD<CNT>,BOL)    :S(YNEWONLY)
      * COMPARE A LINE, IF THE SAME GO TO NEXT LINE LOOP
            IDENT(TRIMCOMPARE,'YES')
      +     IDENT(TRIM(NEW<CNT>),TRIM(OLD<CNT>))   :S(YUCKLOOP)
            DIFFER(TRIMCOMPARE,'YES')
      +     IDENT(NEW<CNT>,OLD<CNT>)      :S(YUCKLOOP)
      * LINES ARE DIFFERENT, ADD THE LINE NO. TO THE LIST
      * SET THE CURRENT TO THE LATEST ELEMENT
           NEXTDIFF(CURRENT) = DIFFLINES(CNT,NULL)
            CURRENT = NEXTDIFF(CURRENT) :(YUCKLOOP)
      YOLDONLY
      * ONLY THE OLD IS LEFT, SET ALL ITS LINES TO DIFFERENT
            NEXTDIFF(CURRENT) = DIFFLINES(CNT,NULL)
            CURRENT = NEXTDIFF(CURRENT)
            CNT = ?(OLD<CNT+1>) CNT + 1  :F(YUCKPRINT)
10          IDENT(OLD<CNT>,BOL) :S(YUCKPRINT)F(YOLDONLY)
      YNEWONLY
      * ONLY THE NEW IS LEFT, SAME NOTE AS ABOVE
            NEXTDIFF(CURRENT) = DIFFLINES(CNT,NULL)
            CURRENT = NEXTDIFF(CURRENT)
            CNT = ?(NEW<CNT+1>) CNT + 1 :F(YUCKPRINT)
            IDENT(NEW<CNT>,BOL) :S(YUCKPRINT)F(YOLDONLY)
      YUCKPRINT
      * TIME TO PRINT
      * IF WE ONLY HAVE ONE ELEMENT, RETURN
            IDENT(NEXTDIFF(HEAD),NULL) :S(RETURN)
      * BUMP FAILING PAGE COUNT
            COMPAIRETAB<CNAME> = COMPAIRETAB<CNAME> + 1
      * IF NO IBMCC, PRINT OLD AND NEW PAGES
      * BEGINNING OF CODE TO BE DELETED
      *     $DIFFDD = 'BEFORE OLD PAGE'
      *     PRINTPAGE(OLD,DIFFDD)
      *     $DIFFDD = 'AFTER OLD PAGE AND BEFORE NEW PAGE'
      *        PRINTPAGE(NEW,DIFFDD)
      *     $DIFFDD = 'AFTER NEW PAGE'   :S(RETURN)
      * END OF CODE TO BE DELETED
            DIFFER(IBMCC,1) PRINTPAGE(OLD,DIFFDD,"> ",FORMFEED "> ")
      +         PRINTPAGE(NEW,DIFFDD,"< ",FORMFEED "< ")  :S(RETURN)
      * IF IBMCC, PRINT OLD AND NEW WITH UNDERLINING
            ARY = OLD
      YUCK0 CURRENT = NEXTDIFF(HEAD)
            CNT = 0
      YUCK1 CNT = ?(ARY<CNT+1>) CNT + 1 :F(YUCK2)
            IDENT(ARY<CNT>,BOL)    :S(YUCK2)
            $DIFFDD = EQ(CNT,1) '1' ARY<CNT>
40          $DIFFDD = EQ(CNT,1) '' ARY<CNT>
            EQ(VALUE(CURRENT),CNT)  :F(YUCK1)
            CURRENT = DIFFER(NEXTDIFF(CURRENT),NULL)
      +         NEXTDIFF(CURRENT)
            $DIFFDD = UNDERLINE :(YUCK1)
      YUCK2 DIFFER(SIGGY,NULL)   :S(RETURN)
            SIGGY = 1
            ARY = NEW :(YUCK0)
```

```
        ENDCOMPAIRE

-STITL     DEBUG

        DEFINE('DEBUG(S)','START_DEBUG') :(END_DEBUG)
     START_DEBUG
         IDENT(S,'ON')              :S(ON_DEBUG)
         IDENT(S)                   :S(ON_DEBUG)
         &TRACE = 0
         &FTRACE = 0
         OUTLISTING = OUTLISTING_MSG "DEBUGGING OFF"
                                    :(RETURN)
     ON_DEBUG
         OUTLISTING = OUTLISTING_MSG "DEBUGGING ON"
         &TRACE = 10000
         &FTRACE = 10000
         TRACE(.IOASOCVAR1,'V')
         TRACE(.IOASOCVAR1,'A')
         TRACE(.IOASOCVAR2,'V')
         TRACE(.IOASOCVAR2,'A')
         TRACE(.OPENINPUTFILES,'V')    :(RETURN)
     END_DEBUG

-STITL     DEFSTMT

DEFINE('DEFSET(WSET,USINGS)USE,USE2')
     +         :(ENDDEFSET_DEFSET)
     DEFSET
     +    USINGS BTN "(" BASEEXP1 . USE ")" ENDOFDEF =
     +                              :S(INPUTFILE_DEFSET)
         USINGS BTN BASEEXP1 . USE ENDOFDEF =
     +        :S(WORKINGSET_DEFSET)
         OUTLISTING = OUTLISTING_ERROR
     +       "INVALID USING IN DEFINE STATEMENT: "
     +                              :(FRETURN)
     INPUTFILE_DEFSET
     +    USE BT =
         USE = TRIM(REPLACE(USE,TAB,BLANK))
         INPUTTAB< USE> = IDENT(INPUTTAB< USE> ) USE
     WORKINGSET_DEFSET
     +    TEMPASSO< USE> = TEMPASSO< USE> ";" WSET
         IDENT(USINGS)              :S(RETURN)F(DEFSET)
     ENDDEFSET_DEFSET

-STITL     DENDSTMT

DEFINE('ENDSET(WSET)')         :(ENDENDSET)
     ENDSET OUTLISTING = OUTLISTING_MSG' '
         COLLECT(1)
         CODETAB< WSET> =
     +       CODE( NONCOMP< WSET> ':(BACK)')
     CRR   CURWSET = NULL            :(RETURN)
     ENDENDSET

    -STITL     ENLARGEPAGE.S

DEFINE("ENLARGEPAGE(PAGE)PROTO,LOW,HIGH,OLDHIGH
```

```
     +     CNT')
     +                          :(END_ENLARGEPAGE)
    ENLARGEPAGE
     +    PROTO = PROTOTYPE(PAGE)
          PROTO = BREAKX(":") . LOW ":" NUMBER . OLDHIGH RPOS(0)
          HIGH = CONVERT(HIGH * 1.5, 'INTEGER')
          LT(HIGH,PAGESIZE + 10)             :S(GO_ENLARGEPAGE)
          OUTLISTING = OUTLISTING_MSG
     +         "PAGE SIZE EXAUSTED.- ENLARGING PAGES FROM: "
     +         (OLDHIGH - 10) " TO: " (HIGH - 10)
          NULLARRAY = ARRAY(LOW ":" HIGH)
          NULLARRAY< 1> = BOL
     *    EOFARRAY = COPY(NULLARRAY)
     *    EOFARRAY< 0> = EOF
          PAGESIZE = HIGH - 10
    GO_ENLARGEPAGE
     +    ENLARGEPAGE = COPY(NULLARRAY)
    LOOP_ENLARGEPAGE
     +    ENLARGEPAGE< CNT> = PAGE< CNT>
          CNT = LT(CNT,HIGH) DIFFER(ENLARGEPAGE< CNT> ,BOL)
     +    CNT + 1            :S(LOOP_ENLARGEPAGE)F(RETURN)
    END_ENLARGEPAGE

-STTTL     FILEROUTINE - FILEROUTINE.S

DEFINE('FILEROUTINE()TUPIN')   :(END_FILEROUTINE)
    FILEROUTINE
    NEWPAGE_FILEROUTINE
    *
    *   GET CURRENT FILENAME
    *
          TUPIN = INPUTARRAY< I,1>
    *
    *   GET LIST OF DEPENDENTS FOR CURRENT FILE
    *
          LIST2OFDEP = TEMPASSO< TUPIN>
    *
    *   IF I AM READING NON-ROUNDROBIN, CALL READAPAGE
    *   IF I AM READING  ROUNDROBIN, CALL READORNULL
    *
          IDENT(DEFAULTREAD,'ROUNDROBIN') :S(ROUNDROB1_FILEROUTINE)
    *     PAGE =   READAPAGE('READ1IIIII',TUPIN)
          PAGE =   READAPAGE(TUPIN)
     +                          :F(RETURN)S(ROUNDR2_FILEROUTINE)
    ROUNDROB1_FILEROUTINE
          PAGE = READORNULL(TUPIN)
    *  BUMP PAGECNT
    ROUNDR2_FILEROUTINE
     +    PAGECNT = PAGECNT + 1
    *
    *   FOR EACH DEPENDENT WORKING SET SEND PAGE THROUGH
    *
    MOREDEP_FILEROUTINE
     +    LIST2OFDEP ';' WORD . DEPENDENT =    :F(ISNEWPAGE_FILEROUTINE)
          IDENT(LOOPCHECKING,'OFF')          :S(CALLST_FILEROUTINE)
          IDENT(DEPENDENT,TUPIN)             :F(CALLST_FILEROUTINE)
```

```
        SIGLOOP()                        :(END)
        CALLST_FILEROUTINE
        +    CALLSTRING = ';' DEPENDENT ';' TUPIN
             LIST2OFDEP ';' WORD            :F(LASTONF_FILEROUTINE)
             ROUT(COPY(PAGE),DEPENDENT,CALLSTRING)   :(MOREDEP_FILEROUTINE)
        LASTONF_FILEROUTINE
        +    ROUT(PAGE,DEPENDENT,CALLSTRING)         :(MOREDEP_FILEROUTINE)
        *
        *  IF ROUNDROBIN, RETURN TO GET NEXT FILE; OTHERWISE, GET NEXT PAGE
        *
        ISNEWPAGE_FILEROUTINE
        +    IDENT(DEFAULTREAD,'ROUNDROBIN') :S(RETURN)F(NEWPAGE_FILEROUTINE)
        END_FILEROUTINE

-STTTL    FINDOCCURSEGS

DEFINE('FINDOCCURSEGS(PTT,PAGE)CNT,P1,P2,TEMP1,'
        +    'HEAD,CURRENT')
        +                :(ENDFINDOCCURSEGS)
        FINDOCCURSEGS
             &ANCHOR = 0
             CNT = 1
        NEXLCN  IDENT(PAGE< CNT> ,BOL) :S(RETURN)
             PAGE< CNT>  @P1 PTT @P2 :S(NEXKCN)
             CNT = ?(PAGE< CNT + 1> ) CNT + 1 :F(RETURN)S(NEXLCN)
        NEXKCN  HEAD = SEGMENT(CNT,P1 + 1,P2)
             FINDOCCURSEGS = HEAD
             CURRENT = HEAD
             TEMP1 = P1
        NEXICN  PAGE< CNT>  @P1 PTT @P2 *GT(P1,TEMP1) :F(NEXCN)
             TEMP1 = P1
             FINISH(CURRENT) = LE(P1,FINISH(CURRENT))
        +    GT(P2,FINISH(CURRENT)) P2 :S(NEXICN)
             LE(P1,FINISH(CURRENT)) LE(P2,FINISH(CURRENT)) :S(NEXICN)
             NEXT(CURRENT) = SEGMENT(CNT,P1 + 1,P2)
             CURRENT = NEXT(CURRENT) :(NEXICN)
        NEXCN  CNT = ?(PAGE< CNT + 1> ) CNT + 1 :F(RETURN)
             IDENT(PAGE< CNT> ,BOL) :S(RETURN)
             PAGE< CNT>  @P1 PTT @P2 :F(NEXCN)
             TEMP1 = P1
             NEXT(CURRENT) = SEGMENT(CNT,P1 + 1,P2)
             CURRENT = NEXT(CURRENT)
        NEXJN  PAGE< CNT>  @P1 PTT @P2 *GT(P1,TEMP1) :F(NEXCN)
             TEMP1 = P1
             FINISH(CURRENT) = LE(P1,FINISH(CURRENT))
        +    GT(P2,FINISH(CURRENT)) P2 :S(NEXJN)
             LE(P1,FINISH(CURRENT)) LE(P2,FINISH(CURRENT)) :S(NEXJN)
             NEXT(CURRENT) = SEGMENT(CNT,P1 + 1,P2)
             CURRENT = NEXT(CURRENT) :(NEXJN)
        ENDFINDOCCURSEGS

-STTTL    FINDSEGLIST

DEFINE('FINDSEGLIST(SHAPE)HEAD,CURRENT,'
        +    'LEMON1,LEMON2,LEMON3,LEMON4') :(ENDFINDSEGLIST)
        FINDSEGLIST
```

```
           SHAPE BLOCKPAT :S(BLOCKGO)
           SHAPE NUMPAT :F(LIME1)
           IDENT(NTSHAP,'LINES') :S(LINEGO)
           IDENT(NTSHAP,'COLUMNS') :S(COLGO)F(LIME2)
     LIME1 SHAPE COOPAT :F(LIME2)
           IDENT(CTSHAP,'BOXES') :S(BOXGO)
           IDENT(CTSHAP,'STRINGS') :S(STRGO)F(LIME2)
     LIME2 OUTLISTING = OUTLISTING_ERROR 'INCORRECT SEGLIST SPEC' :(RETURN)
           BLOCKGO SEGM COORDPAIRS = :F(MALFORMEDSEGLIST)
           HEAD = SEGMENT(SVS1,SVS2,SVS3)
           FINDSEGLIST = HEAD
           CURRENT = HEAD
     LOOPBL SEGM COORDPAIRS = :F(RETURN)
           NEXT(CURRENT) = SEGMENT(SVS1,SVS2,SVS3)
           CURRENT = NEXT(CURRENT) :(LOOPBL)
     LINEGO HEAD = SEGMENT(LEMON1,1,'*')
     *     OUTPUT = 'AT LINEGO:' LEMON1 ' 1-*'
           FINDSEGLIST = HEAD
           CURRENT = HEAD
     LOOPLN EQ(LEMON1,LEMON2) :S(RETURN)
           LEMON1 = LEMON1 + 1
           NEXT(CURRENT) = SEGMENT(LEMON1,1,'*')
           CURRENT = NEXT(CURRENT) :(LOOPLN)
     COLGO FINDSEGLIST = SEGMENT('*',LEMON1,LEMON2) :(RETURN)
     BOXGO HEAD = SEGMENT(LEMON1,LEMON2,LEMON4)
           FINDSEGLIST = HEAD
           CURRENT = HEAD
     LOOPBX EQ(LEMON1,LEMON3) :S(RETURN)
           LEMON1 = LEMON1 + 1
           NEXT(CURRENT) = SEGMENT(LEMON1,LEMON2,LEMON4)
           CURRENT = NEXT(CURRENT) :(LOOPBX)
     STRGO FINDSEGLIST = SEGMENT(LEMON1,LEMON2,LEMON4) :(RETURN)
     ENDFINDSEGLIST

     -STITL    GETKEYSEG

DEFINE('GETKEYSEG(KEY,PG)') :(ENDGETKEYSEG)
     GETKEYSEG
           KEY COORDPAIRS :F(BADKEYINGETKEYSEG)
           DIFFER(SVS1,'*') DIFFER(SVS2,'*') DIFFER(SVS3,'*')
     +     :F(BADKEYINGETKEYSEG)
           GETKEYSEG = SUBSTR(PG< SVS1> ,SVS2,SVS2 - SVS3 + 1)
     +     :(RETURN)
     ENDGETKEYSEG
     -STITL    GETINTERPAGE

DEFINE('GETINTERPAGE(FILE,INAME)') :(ENDGETINTERPAGE)
     GETINTERPAGE
           IDENT(HOLDPAGE< INAME> ,NULL) :S(GETNEWONE)
           GETINTERPAGE = HOLDPAGE< INAME> :(RETURN)
     GETNEWONE
           HOLDPAGE< INAME> = READAPAGE(FILE) :F(TZ1)
           GETINTERPAGE = HOLDPAGE< INAME> :(RETURN)
10   TZ1   IDENT(ISFIRSTEOF< INAME> ,NULL) :F(TZ2)
           ISFIRSTEOF< INAME> = 'NO'
```

```
TZ2  HOLDPAGE< INAME> = COPY(NULLARRAY)
         GETINTERPAGE = HOLDPAGE< INAME>   :(RETURN)
     ENDGETINTERPAGE

-STTTL      GETSTMT –I–

*   THIS ROUTINE WILL READ A STATEMENT FROM INPUT, AND WILL RETURN IT.
  *   STATEMENTS END WITH ;, HOWEVER THERE IS CURRENTLY ONLY ONE
  *   STATEMENT PER LINE THE INPUT IS WRITTEN TO A LISTING FILE
         GETSTMT_LINE_NUMBER = 0
         GETSTMT_STMT_NUMBER = 0

DEFINE('GETSTMT()STARTPOS,SEMIPOS,C1,C2,LINE')
   +                                 :(END_GETSTMT)
     GETSTMT GETSTMT =
         GETSTMT_STMT_NUMBER = GETSTMT_STMT_NUMBER + 1
         S1 =
         S2 =
         WSET =
         CONT =
         STARTPOS = 0
     NEXTLIN_GETSTMT
   +     LINE = INPUT               :F(FRETURN)
         LINE = DIFFER(TRIMSTMT,NULL) SUBSTR(LINE,1,TRIMSTMT)
         GETSTMT_LINE_NUMBER = GETSTMT_LINE_NUMBER + 1
         OUTLISTING =    LPAD(GETSTMT_LINE_NUMBER,5)
   +              LPAD(GETSTMT_STMT_NUMBER,7)
   +              "  " LINE
         GETSTMT = IDENT(GETSTMT,NULL) LINE
   +                         :F(CONTILIN_GETSTMT)
         GETSTMT POS(0) '*'   :S(RETURN)F(MATCHIT_GETSTMT)
     CONTILIN_GETSTMT
   +     GETSTMT = GETSTMT ' ' LINE
     MATCHIT_GETSTMT
   +     GETSTMT BREAK(';') ';' @SEMIPOS *GT(SEMIPOS,STARTPOS)
   +                         :F(NEXTLIN_GETSTMT)
         GETSTMT @C1 ELITERAL @C2 *GT(C2,SEMIPOS)
   +     *LT(C1,SEMIPOS)             :F(RETURN_GETSTMT)
         STARTPOS = SEMIPOS           :(MATCHIT_GETSTMT)
     RETURN_GETSTMT
         GETSTMT = SUBSTR(GETSTMT,1,SEMIPOS)   :(RETURN)
     END_GETSTMT

-STTTL      GRABCLOUD

DEFINE('GRABCLOUD(PAGE,PAT)CLOUDTEMP,IC,PGS')
   +        :(ENDGRABCLOUD)
     GRABCLOUD
         &ANCHOR = DEFAULTCLOUDPATANCHOR
         IC = 1
         IDENT(PAGE< IC> ,NULL)   :S(OUTLINE3)
     NLINE3 PGS = PGS BOL IC BOL PAGE< IC>
         IDENT(PAGE< IC> ,BOL)   :S(OUTLINE3)
         PAGE< IC>              :F(OUTLINE3)
         IC = IC + 1          :(NLINE3)
     OUTLINE3
```

```
        PGS PAT . CLOUDTEMP
        &ANCHOR = DEFAULTANCHOR
        GRABCLOUD = CLOUDTEMP   :(RETURN)
    ENDGRABCLOUD

-STITL      GRABNOTCLOUD

        DEFINE('GRABNOTCLOUD(PAGE,PAT)PGS,IC')
    +       :(ENDGRABNOTCLOUD)
    GRABNOTCLOUD
        &ANCHOR = DEFAULTCLOUDPATANCHOR
        IC = 1
        IDENT(PAGE< IC> ,NULL)   :S(OUTLINE2)
    NLINE2  PGS = PGS BOL IC BOL PAGE< IC>
        IDENT(PAGE< IC> ,BOL)    :S(OUTLINE2)
        PAGE< IC>                :F(OUTLINE2)
        IC = IC + 1              :(NLINE2)
    OUTLINE2
        PGS PAT =
        &ANCHOR = DEFAULTANCHOR
        GRABCLOUD = PGS          :(RETURN)
    ENDGRABNOTCLOUD

    -STITL      INITIALIZATION

DEFINE('INITIALIZE()')   :(INITIALIZEEND)
    INITIALIZE
        ON = 1
        OFF = 0
        DEFAULTANCHOR = 1
        DEFAULTWITH = ' '
        DEFAULTCLOUDPATANCHOR = 0
        DEFAULTCLOUDWITHEVAL = 1
        DEFAULTCLOUDDUPL = 0
        DEFAULTREAD = 'ROUNDROBIN'
        LOOPCHECKING = 'ON'
        OTHERWISEOPT = NULL
    *   INSERT ASCII EBCDIC CHECK HERE AND ALSO DONT FORGET
        MACHINE = LLT('A',1) 'IBM'
        MACHINE =   LLT('A',1) 'UNIX' :F(NOTUNIX_INITIALIZE)
        HOST() ARB "SUN" : MACHINE ARB  :F(NOTUNIX_INITIALIZE)
        MACHINE_INPUT_ARG_3 = " -B1024"
    NOTUNIX_INITIALIZE
        IBMCC = 1
        MAXCOMPARES = 20
        OPENINPUTFILES = 0

*   SET WHEN FILE IS OPENED - USED BY READAPAGE
        DATA("READAPAGE_NODE(RAPN_IOVARNAME,RAPN_PAGENO,RAPN_LINE,"
    +               "RAPN_IBMCC,RAPN_PAGESTART,"
    +               "RAPN_BLANKCOUNT,"
    +               "RAPN_EOF"
    +               ")")
        READAPAGE_MASTERTABLE = TABLE(100)
        OPENIN_GENSYM_COUNTER = 0
```

```
          PAGESIZE = 66
          &TRIM = 1
          IDENT(MACHINE,'IBM') :F(NOTIBM)
          &FULLSCAN = 1
    NOTIBM &ANCHOR = DEFAULTANCHOR
          &STLIMIT = 1000000000
          &MAXLNGTH = 32758
          PAGESTART = '1'
          LABCNT = 1
          PAGETAB = TABLE(100)
          ISFIRSTEOF = TABLE(50)
          HOLDPAGE = TABLE(50)
          BOL = SUBSTR(&ALPHABET,004,1)
          NC = SUBSTR(&ALPHABET,009,1)
          EOF = SUBSTR(&ALPHABET,005,1)
          FORMFEED = DIFFER(MACHINE,'IBM') SUBSTR(&ALPHABET,7,1)
          TEMPASSO = TABLE(100)
          NONCOMP = TABLE(100)
          CODETAB = TABLE(100)
          REMEMBERY = TABLE(50)
          MAXFILE = 10
          INPUTTAB = TABLE(MAXFILE)
          WSPGCOUNT = TABLE(20,0)
          SEGTAB = TABLE(20)
          OUTFILETAB = TABLE(MAXFILE)
          NONUSINGINS = TABLE(MAXFILE)
          COMPAIRETAB = TABLE(100)
          TRIMCOMPARE = 'YES'
          OPPVRB = TABLE(3)
          OPPVRB<'CHOOSE'> = 'REMOVE'
          OPPVRB<'REMOVE'> = 'CHOOSE'
          OPPVRB<'REB'> = 'REPLACE'
          UNDERLINE = '+' DUPL('_',131)
*         UNDERLINE = '+' DUPL('_',132)
          BLANKLINE = ' '
          INPUTFILENO = 0
          IDENT(MACHINE,'IBM') INPUT('INPUT')
*         IDENT(MACHINE,'UNIX') INPUT('INPUT','INPUT','INPUT')
          IDENT(MACHINE,'IBM') OUTPUT('OUTLISTING','LISTING')
          DIFFER(MACHINE,'IBM') OUTPUT('OUTLISTING',
     +        'OUTLISTING','LISTING -W')
          OUTLISTING_ERROR = "ERROR *****   "
          OUTLISTING_MSG  = "***** *****   "
          OUTLISTING = ' '
          OUTLISTING = DUPL("*",72)
          OUTLISTING = "*" DUPL(" ",68) "*"

          OUTLISTING = "*" DUPL(" ",68) "*"
          OUTLISTING = DUPL("*",72)
          OUTLISTING = " "
          OUTLISTING = DUPL(' ',17)
     +        'PHASER - PAGE HANDLING ANALYZER SYNTHESIZER'
          OUTLISTING = ' '
          OUTLISTING =   "LINE#  STMT#    INPUT"
          OUTLISTING =   "=====  =====    ==================== ..."
          DATA('SEGMENT(LINEN,START,FINISH,NEXT)')
          DATA('MUSHSTACK(LINENY,STARTY,FINISHY,NEXTY)')
```

```
        DATA('DIFFLINES(VALUE,NEXTDIFF)')
        MAGICNUM = &MAXLNGTH + 1
        NULLARRAY = ARRAY('0:' PAGESIZE + 10)
        NULLARRAY< 1> = BOL
        EOFARRAY = ARRAY('0:5')
        EOFARRAY< 1> = BOL
        EOFARRAY< 0> = EOF
        PAGECNT = 1   :(RETURN)
    INITIALIZEEND

-STITL    INTERSPERSE

        DEFINE('INTERSPERSE(INTERID,PAGE,FILEPAGE,NEWDD,KEY,KEY2,'
    +       'TYPE,REVERSED)TEMPPAGE')
    +       :(ENDINTERSPERSE)
    INTERSPERSE
        IDENT(PAGE< 1> ,BOL) IDENT(FILEPAGE< 1> ,BOL) :S(RETURN)
        IDENT(PAGE< 1> ,BOL) PRINTPAGE(FILEPAGE,NEWDD) :S(RETURN)
        IDENT(FILEPAGE< 1> ,BOL) PRINTPAGE(PAGE,NEWDD) :S(RETURN)
        KEYPAGE = GETKEYSEG(KEY,PAGE)
        KEYFILEPAGE = GETKEYSEG(KEY2,FILEPAGE)
        IDENT(KEYPAGE,KEYFILEPAGE)    :F(INTERSPERSE1)
        IDENT(REVERSED,'REVERSED') :S(INTERSPERSE0)
        MATCH(SMERGE,TYPE)
    +     PRINTPAGE(MRGSIDEBYSIDE(COPY(PAGE),COPY(FILEPAGE)),NEWDD)
    +     :S(CLEARBUFF)
        TEMPPAGE = MATCH(LMERGE,TYPE)
    +     PRINTPAGE(MRGLINEBYLINE(COPY(PAGE),COPY(FILEPAGE)),NEWDD)
    +     :S(CLEARBUFF)
        TEMPPAGE = MATCH(OMERGE,TYPE)
    +     PRINTPAGE(MRGONEAFTER(COPY(PAGE),COPY(FILEPAGE)),NEWDD)
    +     :(CLEARBUFF)
    INTERSPERSE0
        MATCH(SMERGE,TYPE)
    +     PRINTPAGE(MRGSIDEBYSIDE(COPY(FILEPAGE),COPY(PAGE)),NEWDD)
    +     :S(CLEARBUFF)
        TEMPPAGE = MATCH(LMERGE,TYPE)
    +     PRINTPAGE(MRGLINEBYLINE(COPY(FILEPAGE),COPY(PAGE)),NEWDD)
    +     :S(CLEARBUFF)
        TEMPPAGE = MATCH(OMERGE,TYPE)
    +     PRINTPAGE(MRGONEAFTER(COPY(FILEPAGE),COPY(PAGE)),NEWDD)
    +     :(CLEARBUFF)
    INTERSPERSE1
        LLT(KEYPAGE,KEYFILEPAGE) :F(INTERSPERSE2)
        PRINTPAGE(PAGE,NEWDD) :(RETURN)
    INTERSPERSE2
    *   LGT(KEYPAGE,KEYFILEPAGE)
        PRINTPAGE(FILEPAGE,NEWDD)
        HOLDPAGE(INTERID) = NULL :(FRETURN)
    CLEARBUFF
        HOLDPAGE(INTERID) = NULL :(RETURN)
    ENDINTERSPERSE

-STITL    ISALOOP

DEFINE('ISALOOP()')        :(ENDISALOOP)
    ISALOOP
```

```
         CALLSTRING ARB ';' DEP2 (BREAK(';') | RPOS(0))
   +                  :S(RETURN)F(FRETURN)
     ENDISALOOP

-STTL    KMIN

DEFINE('KMIN(NUM1,NUM2)') :(ENDKMIN)
     KMIN
         KMIN = LE(NUM1,NUM2) NUM1 :S(RETURN)
         KMIN = NUM2 :(RETURN)
     ENDKMIN

-STTL    MATCH

DEFINE('MATCH(PATTRN,STRNG)')       :(ENDMATCH)
     MATCH
         STRNG PATTRN              :S(RETURN) F(FRETURN)
     ENDMATCH

-STTL    MATCHSEGS

DEFINE('MATCHSEGS(PATT,HEAD,PAGE)CURRENT,'
     +   'ST,FN,CNTR,LASTLINE,TEMPCNTR') :(ENDMATCHSEGS)
     MATCHSEGS
         CURRENT = HEAD
         LASTLINE = 0
         &ANCHOR = 0
     MNEXT IDENT(LINEN(CURRENT),'*') :S(ALLLINE)
         TEMPCNTR = 0
     MMNEX ?(PAGE< TEMPCNTR + 1> ) :F(MMNEX1)
         TEMPCNTR = TEMPCNTR + 1
         IDENT(PAGE< TEMPCNTR> ,BOL) :S(FRETURN)
         EQ(LINEN(CURRENT),TEMPCNTR) :F(MMNEX)
     MMNEX1 IDENT(FINISH(CURRENT),'*') :S(STFINIS)
         PAGE< LINEN(CURRENT)> @ST PATT @FN
     +      *EQ(ST + 1,START(CURRENT))
     +      *EQ(FN,FINISH(CURRENT)) :S(RETURN)F(MNEXT1)
     STFINIS PAGE< LINEN(CURRENT)> @ST PATT @FN
     +      *EQ(ST + 1,START(CURRENT))
     +      *EQ(FN,SIZE(PAGE< LINEN(CURRENT)> )) :S(RETURN)
     MNEXT1 LASTLINE = LINEN(CURRENT)
         CURRENT = DIFFER(NEXT(CURRENT),NULL) NEXT(CURRENT)
     +           :S(MNEXT)F(FRETURN)
     ALLLINE CNTR = ?(PAGE< CNTR + 1> ) LASTLINE + 1 :F(FRETURN)
         IDENT(PAGE< CNTR> ,BOL) :S(FRETURN)
     ALLLIN3 IDENT(FINISH(CURRENT),'*') :S(STFINI2)
         PAGE< CNTR> @ST PATT @FN
     +      *EQ(ST + 1,START(CURRENT))
     +      *EQ(FN,FINISH(CURRENT)) :S(RETURN)F(MNEXT2)
     STFINI2 PAGE< CNTR> @ST PATT @FN
     +      *EQ(ST + 1,START(CURRENT))
     +      *EQ(FN,SIZE(PAGE< CNTR> )) :S(RETURN)
     MNEXT2 CNTR = ?(PAGE< CNTR + 1> ) CNTR + 1
     +           :F(FRETURN)
         IDENT(PAGE< CNTR> ,BOL) :S(FRETURN)F(ALLLIN3)
     ENDMATCHSEGS
```

```
    -STITL      MATCHWHOLEPAGE

DEFINE('MATCHWHOLEPAGE(PATT,PAGE)CNTR')
    +                    :(ENDMATCHWHOLEPAGE)
    MATCHWHOLEPAGE
        &ANCHOR = 0
        CNTR = 1
    NEWL   PAGE< CNTR> PATT       :S(RETURN)
        IDENT(PAGE< CNTR> ,BOL)  :S(FRETURN)
        CNTR = CNTR + 1     :(NEWL)
    ENDMATCHWHOLEPAGE

    -STITL      MRGLINEBYLINE

DEFINE('MRGLINEBYLINE(PAGE1,PAGE2)COUNT1,COUNT2,BIGCOUNT')
    +                    :(END_MRGLINEBYLINE)
    MRGLINEBYLINE
        MRGLINEBYLINE =  NOTNULLPG(PAGE1) NOTNULLPG(PAGE2)
    +               COPY(NULLARRAY)    :S(RETURN)
        MRGLINEBYLINE =  NOTNULLPG(PAGE1) COPY(PAGE2)    :S(RETURN)
        MRGLINEBYLINE =  NOTNULLPG(PAGE2) COPY(PAGE1)    :S(RETURN)
   *    MRGLINEBYLINE = IDENT(PAGE1< 1> ,BOL) COPY(PAGE2) :S(RETURN)
   *    MRGLINEBYLINE = IDENT(PAGE2< 1> ,BOL) COPY(PAGE1) :S(RETURN)
        MRGLINEBYLINE = IDENT(PAGE1< 0> ,EOF) IDENT(PAGE2< 0> ,EOF)
    +               COPY(EOFARRAY)        :S(RETURN)
        MRGLINEBYLINE = COPY(NULLARRAY)
        COUNT1 = 0
        COUNT2 = 0
        BIGCOUNT = 0
    MAIN_MRGLINEBYLINE
    +   BIGCOUNT = BIGCOUNT + 1
        MRGLINEBYLINE =  (MRGLINEBYLINE< BIGCOUNT> )
    +           ENLARGEPAGE(MRGLINEBYLINE)
        COUNT1 = COUNT1 + 1
        MRGLINEBYLINE< BIGCOUNT> = DIFFER(PAGE1< COUNT1> ,BOL)
    +               PAGE1< COUNT1>
        BIGCOUNT = BIGCOUNT + 1
        MRGLINEBYLINE =  (MRGLINEBYLINE< BIGCOUNT> )
    +           ENLARGEPAGE(MRGLINEBYLINE)
        COUNT2 = COUNT2 + 1
        MRGLINEBYLINE< BIGCOUNT> = DIFFER(PAGE2< COUNT2> ,BOL)
    +           PAGE2< COUNT2>
    +           :F(ONEONLY_MRGLINEBYLINE)S(MAIN_MRGLINEBYLINE)
    TWOONLY_MRGLINEBYLINE
    +   MRGLINEBYLINE< BIGCOUNT> = PAGE2< COUNT2>
        IDENT(PAGE2< COUNT2> ,BOL) :S(RETURN)
        BIGCOUNT = BIGCOUNT + 1
        MRGLINEBYLINE =  (MRGLINEBYLINE< BIGCOUNT> )
    +           ENLARGEPAGE(MRGLINEBYLINE)
        COUNT2 = COUNT2 + 1          :(TWOONLY_MRGLINEBYLINE)
    ONEONLY_MRGLINEBYLINE
    +   MRGLINEBYLINE< BIGCOUNT> = PAGE1< COUNT1>
        IDENT(PAGE1< COUNT1> ,BOL)           :S(RETURN)
        BIGCOUNT = BIGCOUNT + 1
        MRGLINEBYLINE =  (MRGLINEBYLINE< BIGCOUNT> )
    +           ENLARGEPAGE(MRGLINEBYLINE)
```

```
        COUNT1 = COUNT1 + 1                  :(ONEONLY_MRGLINEBYLINE)
        END_MRGLINEBYLINE

-STTL      MRGONEAFTERANOTHER - MRGONE.S

MRGONEAFTER =   NOTNULLPG(PAGE1)  NOTNULLPG(PAGE2)
             +              COPY(NULLARRAY) :S(RETURN)
                MRGONEAFTER =   NOTNULLPG(PAGE1) COPY(PAGE2) :S(RETURN)
                MRGONEAFTER =   NOTNULLPG(PAGE2) COPY(PAGE1) :S(RETURN)
        *       MRGONEAFTER = IDENT(PAGE1< 1> ,BOL) COPY(PAGE2) :S(RETURN)
        ** PLEASE NOTE, LINE ABOVE TAKES CARE OF BOTH NULL CASES ALSO
        *       MRGONEAFTER = IDENT(PAGE2< 1> ,BOL) COPY(PAGE1) :S(RETURN)
                MRGONEAFTER = IDENT(PAGE1< 0> ,EOF) IDENT(PAGE2< 0> ,EOF)
             +           COPY(EOFARRAY)         :S(RETURN)
                MRGONEAFTER = COPY(PAGE1)
        *       MRGONEAFTER< 0> = NULL
                CNT2 = 0
                CNT = 0
        MTP1_MRGONEAFTER
             +   CNT = CNT + 1
                ?(MRGONEAFTER< CNT> ) DIFFER(MRGONEAFTER< CNT> ,BOL)
             +                       :S(MTP1_MRGONEAFTER)
        MTP2_MRGONEAFTER
             +   CNT2 = CNT2 + 1
                MRGONEAFTER =   (MRGONEAFTER< CNT> ) ENLARGEPAGE(MRGONEAFTER)
                ?(PAGE2< CNT2> ) DIFFER(PAGE2< CNT2> ,BOL)   :F(RETURN)
                MRGONEAFTER< CNT> = PAGE2< CNT2>
                CNT = CNT + 1               :S(MTP2_MRGONEAFTER)
        END_MRGONEAFTER

-STTL      MRGSIDEBYSIDE

MRGSIDEBYSIDE =   NOTNULLPG(PAGE2)  NOTNULLPG(PAGE1)
             +           COPY(NULLARRAY)
                MRGSIDEBYSIDE =   NOTNULLPG(PAGE2) COPY(PAGE1)   :S(RETURN)
                MRGSIDEBYSIDE =   NOTNULLPG(PAGE1) COPY(PAGE2)   :S(RETURN)
        *       MRGSIDEBYSIDE = IDENT(PAGE2) IDENT(PAGE1) COPY(NULLARRAY)
        *+                              :S(RETURN)
        *       MRGSIDEBYSIDE = IDENT(PAGE2) COPY(PAGE1)   :S(RETURN)
        *       MRGSIDEBYSIDE = IDENT(PAGE1) COPY(PAGE2)   :S(RETURN)
        *       MRGSIDEBYSIDE = IDENT(PAGE1< 1> ,BOL) COPY(PAGE2) :S(RETURN)
        *       MRGSIDEBYSIDE = IDENT(PAGE2< 1> ,BOL) COPY(PAGE1) :S(RETURN)
                MRGSIDEBYSIDE = IDENT(PAGE1< 0> ,EOF) IDENT(PAGE2< 0> ,EOF)
             +           COPY(EOFARRAY)        :S(RETURN)
                CNT = 0
                MRGSIDEBYSIDE = COPY(PAGE1)
                MRGSIDEBYSIDE< 0> = NULL
        PHASE1_MRGSIDEBYSIDE
             +   CNT = CNT + 1
                MRGSIDEBYSIDE = (MRGSIDEBYSIDE< CNT> ) ENLARGEPAGE(MRGSIDEBYSIDE)
                IDENT(MRGSIDEBYSIDE< CNT> ,BOL)      :S(PHASE2_MRGSIDEBYSIDE)
                IDENT(PAGE2< CNT> ,BOL)              :S(RETURN)
                MRGSIDEBYSIDE< CNT> = MRGSIDEBYSIDE< CNT> PAGE2< CNT>
             +                      :S(PHASE1_MRGSIDEBYSIDE)
        PHASE2_MRGSIDEBYSIDE
             +   MRGSIDEBYSIDE< CNT> = PAGE2< CNT>
```

```
            IDENT(PAGE2< CNT> ,BOL)           :S(RETURN)
            CNT = CNT + 1
            MRGSIDEBYSIDE = (MRGSIDEBYSIDE< CNT> ) ENLARGEPAGE(MRGSIDEBYSIDE)
      +                            :(PHASE2_MRGSIDEBYSIDE)
      END_MRGSIDEBYSIDE

-STITL    MUSHBYSEGS

DEFINE('MUSHBYSEGS(VRB,WTH,PAGE,HEAD)LASTLINE,CNTR,'
      +    'MUSHCUR1,MUSHCUR2,CURRENTLY,CURRENT,TEMPLINE,WTHLEN,'
      +    'CNTR2,NULLINES')         :(ENDMUSHBYSEGS)
      MUSHBYSEGS
            MUSHBYSEGS = PAGE
            &ANCHOR = 0
            LASTLINE = 0
            CURRENT = HEAD :F(BADHEAD)
            IDENT(CURRENT,NULL) DIFFER(VRB,'CHOOSE') :S(RETURN)
            PAGE< 1> = IDENT(CURRENT,NULL) BOL :S(RETURN)
      *
      *     REMOVE CODE
      *
      LO1   IDENT(VRB,'REMOVE')    :F(CHOV)
      LO2   IDENT(LINEN(CURRENT),'*') :S(RMRESTOFLINES)
            MUSHCUR1 =
      +     MUSHSTACK(LINEN(CURRENT),START(CURRENT),FINISH(CURRENT))
      NEXLE  CURRENT = DIFFER(NEXT(CURRENT),NULL)
      +     EQ(LINEN(CURRENT),LINEN(NEXT(CURRENT)))
      +     NEXT(CURRENT)   :F(DESTACK)
            MUSHCUR2 = MUSHSTACK(LINEN(CURRENT),START(CURRENT),
      +     FINISH(CURRENT))
            NEXTY(MUSHCUR2) = MUSHCUR1
            MUSHCUR1 = MUSHCUR2 :(NEXLE)
      DESTACK CURRENTLY = MUSHCUR1
      DEST10 IDENT(FINISHY(CURRENTLY),'*') :F(RMNUMNUM)
            PAGE< LINENY(CURRENTLY)> = EQ(STARTY(CURRENTLY),1) NULL
      +     :S(RMNEXX)
            PAGE< LINENY(CURRENTLY)> POS(STARTY(CURRENTLY) - 1) REM =
      +     :(RMNEXX)
      RMNUMNUM
            PAGE< LINENY(CURRENTLY)>
      +     POS(STARTY(CURRENTLY) - 1) LEN(FINISHY(CURRENTLY)
      +     - STARTY(CURRENTLY) + 1) =
      RMNEXX CURRENTLY = DIFFER(NEXTY(CURRENTLY),NULL) NEXTY(CURRENTLY)
      +     :S(DEST10)
            LASTLINE = LINENY(CURRENTLY)
            CURRENT = DIFFER(NEXT(CURRENT),NULL) NEXT(CURRENT)
      +         :F(XRETURN)S(LO2)
      RMRESTOFLINES
            TEMPLINE = ?(PAGE< LASTLINE + 1> ) NULL :F(XRETURN)
            IDENT(PAGE< LASTLINE + 1> ,BOL) :S(XRETURN)
            PAGE< LASTLINE + 1> = EQ(START(CURRENT),1)
      +     IDENT(FINISH(CURRENT),'*') BOL :S(XRETURN)
            CNTR = LASTLINE
            MUSHCUR1 =
      +     MUSHSTACK(LINEN(CURRENT),START(CURRENT),FINISH(CURRENT))
      NEXLE2 CURRENT = DIFFER(NEXT(CURRENT),NULL)
```

```
     +      IDENT(LINEN(NEXT(CURRENT)),'*') NEXT(CURRENT) :F(NEWLYN)
            MUSHCUR2 = MUSHSTACK(LINEN(CURRENT),START(CURRENT),
     +      FINISH(CURRENT))
            NEXTY(MUSHCUR2) = MUSHCUR1
            MUSHCUR1 = MUSHCUR2  :(NEXLE2)
       NEWLYN CNTR = ?(PAGE< CNTR + 1> ) CNTR + 1 :F(XRETURN)
            IDENT(PAGE< CNTR> ,BOL) :S(XRETURN)
          CURRENTLY = MUSHCUR1
       SAMELIN IDENT(FINISHY(CURRENTLY),'*') :F(RM1)
     RM2    PAGE< CNTR>  POS(STARTY(CURRENTLY) - 1) REM =  :(LO21)
     RM1    PAGE< CNTR>  POS(STARTY(CURRENTLY) - 1)
       +    LEN(FINISHY(CURRENTLY) - STARTY(CURRENTLY) + 1) =
     LO21   CURRENTLY = DIFFER(NEXTY(CURRENTLY),NULL)
       +    NEXTY(CURRENTLY) :F(NEWLYN)S(SAMELIN)
     *
     *    CHOOSE CODE
     *
     CHOV  IDENT(VRB,'CHOOSE') :F(REPLC)
           CNTR = ?(PAGE< 1> ) 1 :F(RETURN)
           IDENT(PAGE< CNTR> ,BOL) :S(RETURN)
     CHO2  IDENT(LINEN(CURRENT),'*') :S(CHRESTOFLINES)
           EQ(CNTR,LINEN(CURRENT)) :F(ICHL)
           TEMPLINE = PAGE< CNTR>
           PAGE< CNTR> = NULL
     DEST1  IDENT(FINISH(CURRENT),'*') :F(ICHL3)
           PAGE< LINEN(CURRENT)> = EQ(START(CURRENT),1)
       +   PAGE< LINEN(CURRENT)> TEMPLINE :(ICHL2)
           PAGE< LINEN(CURRENT)> = PAGE< LINEN(CURRENT)>
       +   SUBSTR(TEMPLINE,START(CURRENT)) :(ICHL2)
     ICHL3  PAGE< LINEN(CURRENT)> = PAGE< LINEN(CURRENT)>
       +   SUBSTR(TEMPLINE,
       +   START(CURRENT),FINISH(CURRENT) - START(CURRENT)
       +   + 1)
     ICHL2  LASTLINE = LINEN(CURRENT)
           CURRENT = DIFFER(NEXT(CURRENT),NULL) NEXT(CURRENT) :F(HIT)
           IDENT(LASTLINE,LINEN(CURRENT)) :S(DEST1)F(ICHL0)
     HIT   PAGE< LINEN(CURRENT) + 1> = BOL :(XRETURN)
     ICHL   PAGE< CNTR> = NULL
     ICHL0  CNTR = ?(PAGE< CNTR + 1> ) CNTR + 1 :F(XRETURN)
           IDENT(PAGE< CNTR> ,BOL) :S(XRETURN)F(CHO2)
     CHRESTOFLINES
           CNTR = LASTLINE
     CHR0   CNTR = ?(PAGE< CNTR + 1> ) CNTR + 1 :F(XRETURN)
           IDENT(PAGE< CNTR> ,BOL) :S(XRETURN)
           TEMPLINE = PAGE< CNTR>
           PAGE< CNTR> = NULL
           CURRENT2 = CURRENT
     CHR00  IDENT(FINISH(CURRENT2),'*') :F(CHR1)
           PAGE< CNTR> = EQ(START(CURRENT2),1) PAGE< CNTR>
       +   TEMPLINE :(CHR2A)
     CHR2   PAGE< CNTR> = PAGE< CNTR> SUBSTR(TEMPLINE,START(CURRENT2))
       +   :(CHR2A)
     CHR1   PAGE< CNTR> = PAGE< CNTR> SUBSTR(TEMPLINE,START(CURRENT2),
       +   FINISH(CURRENT2) - START(CURRENT2) + 1)
     CHR2A  CURRENT2 = DIFFER(NEXT(CURRENT2),NULL)
       +   IDENT(LINEN(NEXT(CURRENT2)),'*') NEXT(CURRENT2) :F(CHR0)
       +   S(CHR00)
```

```
*
*      XRETURN CODE COMPRESSES CHOOSE AND REMOVE VERTICALLY
*      IT MAY BE INCORPORATED INTO THEIR ALGOS AS NECESSARY
*
XRETURN NULLINES = 0
       CNTR2 = 0
BUMPCNTR2
       CNTR2 = ?(PAGE< CNTR2 + 1> ) CNTR2 + 1 :F(RETURN)
       NULLINES = IDENT(PAGE< CNTR2> ,NULL) NULLINES + 1
+      :S(BUMPCNTR2)
       PAGE< CNTR2 - NULLINES> = GT(NULLINES,0) PAGE< CNTR2>
       IDENT(PAGE< CNTR2> ,BOL) :S(RETURN)F(BUMPCNTR2)

*
*      REPLACE CODE
*
REPLC  IDENT(VRB,'REPLACE') :F(BADVERBINMUSHBYSEGS)
       WTH = IDENT(WTH,NULL) DEFAULTWTH
       WTHLEN = SIZE(WTH)
REPO1  IDENT(LINEN(CURRENT),'*') :S(REPRESTOFLINES)
       ?(PAGE< LINEN(CURRENT)> ) :F(RETURN)
       IDENT(PAGE< LINEN(CURRENT)> ,BOL) :S(RETURN)
       IDENT(FINISH(CURRENT),'*') :F(REPNUMNUM)
       PAGE< LINEN(CURRENT)> = EQ(START(CURRENT),1)
+          SUBSTR(DUPL(WTH,SIZE(PAGE< LINEN(CURRENT)> ) / WTHLEN + 1),
+              1,SIZE(PAGE< LINEN(CURRENT)> ))           :S(REPNEXX)
       PAGE< LINEN(CURRENT)> =
+          SUBSTR(PAGE< LINEN(CURRENT)> ,1,START(CURRENT) - 1)
+          LE(START(CURRENT),SIZE(PAGE< LINEN(CURRENT)> ))
+          SUBSTR(DUPL(WTH,(SIZE(PAGE< LINEN(CURRENT)> ) - START(CURRENT)
+              + 1) / WTHLEN + 1),1,SIZE(PAGE< LINEN(CURRENT)> ) -
+          START(CURRENT) + 1)                    :(REPNEXX)
REPNUMNUM
       PAGE< LINEN(CURRENT)> = EQ(START(CURRENT),1)
+          SUBSTR(DUPL(WTH,((FINISH(CURRENT) - START(CURRENT) + 1)
+          / WTHLEN) + 1),1,
+          KMIN(FINISH(CURRENT) - START(CURRENT) + 1,
+          SIZE(PAGE< LINEN(CURRENT)> )))
+          SUBSTR(PAGE< LINEN(CURRENT)> ,FINISH(CURRENT) + 1)
+                                  :S(REPNEXX)
       PAGE< LINEN(CURRENT)> = SUBSTR(PAGE< LINEN(CURRENT)> ,1,
+          START(CURRENT) - 1) LE(START(CURRENT),
+          SIZE(PAGE< LINEN(CURRENT)> ))
+          SUBSTR(DUPL(WTH,((FINISH(CURRENT) - START(CURRENT) + 1) /
+          WTHLEN) + 1),1,KMIN(FINISH(CURRENT) - START(CURRENT) + 1,
+          SIZE(PAGE< LINEN(CURRENT)> )))
+          SUBSTR(PAGE< LINEN(CURRENT)> ,FINISH(CURRENT) + 1)
REPNEXX LASTLINE = LINEN(CURRENT)
       CURRENT = DIFFER(NEXT(CURRENT),NULL)
+          NEXT(CURRENT) :F(RETURN)S(REPO1)
REPRESTOFLINES
       ?(PAGE< LASTLINE + 1> ) :F(RETURN)
       IDENT(PAGE< LASTLINE + 1> ,BOL) :S(RETURN)
REPREST2
       CNTR = LASTLINE + 1
       IDENT(FINISH(CURRENT),'*')   :F(REPO2)
```

```
        EQ(START(CURRENT),1)          :F(REPO3)
   REPO4 PAGE< CNTR> =
   +    SUBSTR(DUPL(WTH,SIZE(PAGE< CNTR> ) /
   +    WTHLEN + 1),1,SIZE(PAGE< CNTR> ))
        CNTR = ?(PAGE< CNTR + 1> ) CNTR + 1    :F(LO23)
        IDENT(PAGE< CNTR> ,BOL) :S(LO23)F(REPO4)
   REPO3 PAGE< CNTR> = SUBSTR(PAGE< CNTR> ,1,START(CURRENT) - 1)
   +    LE(START(CURRENT),SIZE(PAGE< CNTR> ))
   +    SUBSTR(DUPL(WTH,(SIZE(PAGE< CNTR> ) - START(CURRENT) + 1) /
   +    WTHLEN + 1),1,SIZE(PAGE< CNTR> ) - START(CURRENT) + 1)
        CNTR = ?(PAGE< CNTR + 1> ) CNTR + 1    :F(LO23)
        IDENT(PAGE< CNTR> ,BOL) :S(LO23)F(REPO3)
   REPO2 PAGE< CNTR> = EQ(START(CURRENT),1)
   +    SUBSTR(DUPL(WTH,((FINISH(CURRENT) - START(CURRENT) + 1) /
   +    WTHLEN) + 1),1,KMIN(SIZE(PAGE< CNTR> ),
   +    FINISH(CURRENT) - START(CURRENT) + 1))
   +    SUBSTR(PAGE< CNTR> ,FINISH(CURRENT) + 1) :S(REPO5)
        PAGE< CNTR> = SUBSTR(PAGE< CNTR> ,1,START(CURRENT) - 1)
   +    LE(START(CURRENT),SIZE(PAGE< CNTR> ))
   +    SUBSTR(DUPL(WTH,((FINISH(CURRENT) - START(CURRENT) + 1) /
   +    WTHLEN) + 1),1,KMIN(FINISH(CURRENT) - START(CURRENT) + 1,
   +    SIZE(PAGE< CNTR> )))
   +    SUBSTR(PAGE< CNTR> ,FINISH(CURRENT) + 1)
   REPO5 CNTR = ?(PAGE< CNTR + 1> ) CNTR + 1    :F(LO23)
        IDENT(PAGE< CNTR> ,BOL) :S(LO23)F(REPO2)
   LO23 CURRENT = DIFFER(NEXT(CURRENT),NULL)
   +    IDENT(LINEN(NEXT(CURRENT)),'*') NEXT(CURRENT) :F(RETURN)
   +    S(REPREST2)
   ENDMUSHBYSEGS

-STTL    MUSHCLOUD

DEFINE('MUSHCLOUD(VRB,WTH,PG,CLOUDPAT)SAVVE2,TMUSHCLOUD,'
   +    'SAVVE3,SAVVE1,LENWTH,LENSAV,IC,PGS,LENSAV1,LENSAV3')
   +    :(ENDMUSHCLOUD)
   MUSHCLOUD
        IC = 1
        IDENT(PG< IC> ,NULL)    :S(OUTLINE)
   NLINE  PGS = PGS BOL IC BOL PG< IC>
        IDENT(PG< IC> ,BOL)    :S(OUTLINE)
        PG< IC>              :F(OUTLINE)
        IC = IC + 1         :(NLINE)
   OUTLINE &ANCHOR = DEFAULTCLOUDPATANCHOR
        IDENT(VRB,'REMOVE')    :F(CHOOSE)
        PGS CLOUDPAT =         :(CRETURN)
   CHOOSE IDENT(VRB,'CHOOSE')    :F(REPLACE)
        PGS CLOUDPAT . TMUSHCLOUD
        PGS = TMUSHCLOUD      :(CRETURN)
   REPLACE IDENT(VRB,'REPLACE')    :F(REB)
        PGS ARB . SAVVE1 CLOUDPAT . SAVVE2 REM . SAVVE3
        WTH = IDENT(WTH,NULL) DEFAULTWTH
        WTH = IDENT(DEFAULTCLOUDWTHEVAL,1) EVAL(WTH)
        PGS = DIFFER(DEFAULTCLOUDDUPL,1)
   +         SAVVE1 WTH SAVVE3    :S(CRETURN)
        LENWTH = SIZE(WTH)
        LENSAV = SIZE(SAVVE2)
```

```
             PGS = SAVVE1 SUBSTR(DUPL(WTH,(LENSAV / LENWTH) + 1),
     +      1,LENSAV) SAVVE3       :(CRETURN)
    .REB    IDENT(VRB,'REB') :F(BADVRBINMUSHCLOUD)
            PGS ARB . SAVVE1 CLOUDPAT . SAVVE2 REM . SAVVE3
            WTH = IDENT(WTH,NULL)  DEFAULTWITH
            WTH = IDENT(DEFAULTCLOUDWITHEVAL,1) EVAL(WTH)
            PGS = DIFFER(DEFAULTCLOUDDUPL,1)
     +           WTH SAVVE2 WTH :S(CRETURN)
            LENWTH = SIZE(WTH)
            LENSAV1 = SIZE(SAVVE1)
            LENSAV3 = SIZE(SAVVE3)
            PGS = SUBSTR(DUPL(WTH,(LENSAV1 / LENWTH) + 1),
     +        1,LENSAV1) SAVVE2 SUBSTR(DUPL(WTH,(LENSAV3 / LENWTH) + 1),
     +        1,LENSAV3)
     CRETURN IC = 1
     NEXTST PGS BREAKX(BOL) . PGS2 BOL NUMBER BOL = :F(NULLL)
25          PG< IC> = PGS2
            IC = IC + 1       :(NEXTST)
     NULLL  PG< IC> = PGS
            PG< IC + 1> = BOL
            MUSHCLOUD = PG :(RETURN)
30   ENDMUSHCLOUD

-STTL    MUSHRANGE

DEFINE('MUSHRANGE(VRB,WTH,PAGE,FROM,TO)PAGENO')
     +                       :(ENDMUSHRANGE)
     MUSHRANGE
            GE(WSPGCOUNT< DEPENDENT> ,FROM)   LE(WSPGCOUNT< DEPENDENT> ,TO)
     +             :F(FRETURN)
            MUSHRANGE = MUSHWHOLEPAGE(VRB,WTH,PAGE) :(RETURN)
     ENDMUSHRANGE

-STTL    MUSHWHOLEPAGE

            DEFINE('MUSHWHOLEPAGE(VRB,WTH,PG)WTHLEN,'
     +       'LINECNT,RPLAG')
     +                  :(ENDMUSHWHOLEPAGE)
     MUSHWHOLEPAGE
            MUSHWHOLEPAGE = (DIFFER(VRB,'CHOOSE') DIFFER(VRB,'REB'))
     +       PG :S(RETURN)
            IDENT(VRB,'REMOVE') :F(REP)
            PG< 1> = BOL
            MUSHWHOLEPAGE = PG    :(RETURN)
     REP    IDENT(VRB,'REPLACE')   :F(BADVERBINMUSHWHOLEPAGE)
            WTH = IDENT(WTH,NULL) DEFAULTWITH
            WTHLEN = SIZE(WTH)
            LINECNT = 1
     LOOPW  IDENT(PG< LINECNT> ,BOL)     :S(ARETURN)
            RPLAG = SIZE(PG< LINECNT> )
            PG< LINECNT> = SUBSTR(DUPL(WTH,(RPLAG / WTHLEN + 1)),1,RPLAG)
            LINECNT = LINECNT + 1 :(LOOPW)
     ARETURN MUSHWHOLEPAGE = PG :(RETURN)
     ENDMUSHWHOLEPAGE

-STTL    NOTNULLPG
```

```
             DEFINE('NOTNULLPG(PG)CNT')    :(ENDNOTNULLPG)
     NOTNULLPG
             &ANCHOR = 1
     IDENT(PG,NULL)          :S(FRETURN)
     IDENT(PG<1>,,BOL)        :S(FRETURN)
     CNT = 1
     CHECK  IDENT(PG<CNT>,NULL) :F(RETURN)
         ?(PG<CNT>)               :F(FRETURN)
     CNT = CNT + 1          :(CHECK)
     ENDNOTNULLPG

-STITL     NOTSEGS

DEFINE('NOTSEGS(HEAD)CNTR,CURRENT,NEWCURRENT')
     +                :(ENDNOTSEGS)
     NOTSEGS
         NOTSEGS = IDENT(HEAD,NULL) SEGMENT('*',1,'*') :S(RETURN)
         NOTSEGS = IDENT(LINEN(HEAD),'*') IDENT(START(HEAD),1)
     +    IDENT(FINISH(HEAD),'*') NULL :S(RETURN)
         CURRENT = HEAD
         CNTR = 0
         NEWCURRENT = SEGMENT(0,0,0)
         NEWHEAD = NEWCURRENT
     NS0  IDENT(LINEN(CURRENT),'*')    :S(NOTRESTOFLINES)
     NS0A CNTR = CNTR + 1
     *    USE TO BE IDENT(LINEN(CURRENT),CNTR)  :F(WHOLELINE)
         EQ(LINEN(CURRENT),CNTR)       :F(WHOLELINE)
         NEXT(NEWCURRENT) = EQ(START(CURRENT),1)
     +    SEGMENT(LINEN(CURRENT),1,START(CURRENT) - 1) :F(NS1)
         NEWCURRENT = NEXT(NEWCURRENT)
     NS1  NEXT(NEWCURRENT) = DIFFER(FINISH(CURRENT),'*')
     +    DIFFER(NEXT(CURRENT),NULL) IDENT(LINEN(NEXT(CURRENT)),
     +    LINEN(CURRENT)) SEGMENT(LINEN(CURRENT),FINISH(CURRENT)
     +    + 1,START(NEXT(CURRENT)) - 1) :F(NS2)
         NEWCURRENT = NEXT(NEWCURRENT)
         CURRENT = NEXT(CURRENT) :(NS1)
     NS2  NEXT(NEWCURRENT) = DIFFER(FINISH(CURRENT),'*')
     +    DIFFER(NEXT(CURRENT),NULL) DIFFER(LINEN(NEXT(CURRENT)),
     +    LINEN(CURRENT)) SEGMENT(LINEN(CURRENT),FINISH(CURRENT) + 1,
     +    '*') :F(NS3)
         NEWCURRENT = NEXT(NEWCURRENT)
         CURRENT = NEXT(CURRENT) :(NS0)
     NS3  NEXT(NEWCURRENT) = DIFFER(FINISH(CURRENT),'*')
     +    IDENT(NEXT(CURRENT),NULL) SEGMENT(LINEN(CURRENT),
     +    FINISH(CURRENT) + 1,'*') :F(NS4)
         NEWCURRENT = NEXT(NEWCURRENT)
         NEXT(NEWCURRENT) = SEGMENT('*',1,'*')  :(STRPRET)
     *NS4 CURRENT = IDENT(FINISH(CURRENT),'*') IDENT(NEXT(CURRENT),
     *+   NULL) NEXT(CURRENT) :S(STRPRET)
     NS4  NEXT(NEWCURRENT) = IDENT(FINISH(CURRENT),'*')
     +    IDENT(NEXT(CURRENT),NULL) SEGMENT(LINEN(CURRENT) + 1,1,'*')
     +    :F(NS4A)
         NEWCURRENT = NEXT(NEWCURRENT)
         NEXT(NEWCURRENT) = SEGMENT('*',1,'*')  :(STRPRET)
     *   ASSUMES IDENT(FINISH(CURRENT),'*') AND DIFFER(NEXT(CURRENT),NULL)
     NS4A CURRENT = DIFFER(LINEN(NEXT(CURRENT)),LINEN(CURRENT))
```

```
+      NEXT(CURRENT) :F(DUPLLINESINNOTSEGS)S(NS0)
WHOLELINE
       NEXT(NEWCURRENT) = SEGMENT(CNTR,1,'*')
       NEWCURRENT = NEXT(NEWCURRENT) :(NS0A)
STRPRET NOTSEGS = NEXT(NEWHEAD) :(RETURN)
NOTRESTOFLINES
       NEXT(NEWCURRENT) = NEQ(START(CURRENT) - 1) SEGMENT('*',
+      1,START(CURRENT) - 1) :F(NS5)
       NEWCURRENT = NEXT(NEWCURRENT)
NS5    NEXT(NEWCURRENT) = DIFFER(FINISH(CURRENT),'*')
+      DIFFER(NEXT(CURRENT),NULL) IDENT(LINEN(NEXT(CURRENT)),'*')
+      SEGMENT('*',FINISH(CURRENT) + 1,START(NEXT(CURRENT)) - 1)
+      :F(NS6)
       NEWCURRENT = NEXT(NEWCURRENT)
       CURRENT = NEXT(CURRENT) :(NS5)
NS6    NEXT(NEWCURRENT) = DIFFER(FINISH(CURRENT),'*')
+      DIFFER(NEXT(CURRENT),NULL) DIFFER(LINEN(NEXT(CURRENT)),'*')
+      SEGMENT(LINEN(CURRENT),FINISH(CURRENT) + 1,'*') :S(STRPRET)
       NEXT(NEWCURRENT) = DIFFER(FINISH(CURRENT),'*')
+      IDENT(NEXT(CURRENT),NULL) SEGMENT(LINEN(CURRENT),
+      FINISH(CURRENT) + 1,'*') :S(STRPRET)
*      F ASSUMES IDENT(FINISH(CURRENT) AND DIFFER(NEXT(CURRENT),NULL)
*      REGARDLESS OF DIFFER(LINEN(NEXT(CURRENT)),LINEN(CURRENT))
       IDENT(FINISH(CURRENT),'*') IDENT(NEXT(CURRENT),NULL)
+      :S(STRPRET)F(LINEAFTERSTARNOTSEGS)
ENDNOTSEGS

-STTTL    OPTM

DEFINE('OPTM(HEAD)CURRENT,TEMPFINAL1,TEMPFINAL2')
+                 :(ENDOPTM)
OPTM
       OPTM = HEAD
       IDENT(HEAD,NULL) :S(RETURN)
       CURRENT = HEAD
OPTM1  IDENT(NEXT(CURRENT),NULL) :S(RETURN)
       CURRENT = DIFFER(LINEN(CURRENT),LINEN(NEXT(CURRENT)))
+         NEXT(CURRENT) :S(OPTM1)
       TEMPFINAL1 = IDENT(FINISH(CURRENT),'*') MAGICNUM :S(OPTM2)
       TEMPFINAL1 = FINISH(CURRENT)
OPTM2  TEMPFINAL2 = IDENT(FINISH(NEXT(CURRENT)),'*') MAGICNUM
+       :S(OPTM3)
       TEMPFINAL2 = FINISH(NEXT(CURRENT))
OPTM3  CURRENT = (GE(TEMPFINAL1,START(NEXT(CURRENT)))
+      GE(TEMPFINAL2,START(CURRENT))) NEXT(CURRENT) :S(OPTM1)
       START(CURRENT) = GT(START(CURRENT),START(NEXT(CURRENT)))
+      START(NEXT(CURRENT))
       FINISH(CURRENT) = LT(TEMPFINAL1,TEMPFINAL2) TEMPFINAL2
OPTM4  FINISH(CURRENT) = IDENT(FINISH(CURRENT),MAGICNUM) '*'
       NEXT(CURRENT) = NEXT(NEXT(CURRENT)) :(OPTM1)
ENDOPTM

-STTTL    OPENIN - OPENIN.S

*      OPENIN WILL:
*         PERFORM THE INPUT CALL
```

```
     *       INITILISE THE INPUT TABLE: READAPAGE_MASTERTABLE
     *       INCREMENT: OPENINPUTFILES
     *
     *   OPENIN WILL RETURN THE NAME OF THE IOVAR THAT HAS BEEN ASSICIATED WITH
     *       THE FILE.
     *
     *   OPENIN USES THE FOLLOWING EXTERNAL STUFF:
     *       OPENIN_GENSYM_COUNTER  -> USED TO PRODUCE UNIQUE IOVARS
     *       OPENINPUTFILES         -> COUNT OF FILES FOR CONTROL ALGO
     *       IBMCC                  -> OPTION 1= IBMCC 0= NONIBMCC
     *       PAGESTART              -> PATTERN FOR START OF PAGE
     *       MACHINE_INPUT_ARG_3    -> SET BY INIT
     *       MACHINE                -> SUN/UNIX/IBM
     *
     END
         DEFINE("OPENIN(FILENAME)IOVARNAME")          :(END_OPENIN)
     OPENIN
         +   IDENT(MACHINE,"IBM")              :S(NOMINUS_OPENIN)
             FILENAME "-"                      :F(NOMINUS_OPENIN)
             FILENAME = " " FILENAME
             OUTLISTING = OUTLISTING_MSG "FILENAME < " FILENAME
         +           "> BEGINS WITH '-' FILE DESCRIPTOR ASSUMED"
     NOMINUS_OPENIN
         +   OPENIN = DIFFER(READAPAGE_MASTERTABLE< FILENAME> )
         +           RAPN_IOVARNAME(READAPAGE_MASTERTABLE< FILENAME> )
         +                           :S(RETURN)
             OPENIN_GENSYM_COUNTER = OPENIN_GENSYM_COUNTER + 1
             IOVARNAME = "INASOCVAR" OPENIN_GENSYM_COUNTER
             OPENIN = IOVARNAME
             READAPAGE_MASTERTABLE< FILENAME> =
         +       READAPAGE_NODE(IOVARNAME,0,NULL,
         +           IBMCC,PAGESTART,
         +           0,NULL)
             OPENINPUTFILES = OPENINPUTFILES + 1
             IDENT(MACHINE,"IBM")              :S(IBM_OPENIN)
             OUTPUT = PUT("COLLECT()")
             INPUT(IOVARNAME,IOVARNAME,FILENAME)   :S(RETURN_OPENIN)
             OUTLISTING = OUTLISTING_MSG "HAVING PROBLEMS OPENING FILE: "
         +       FILENAME
             OUTPUT = "HAVING PROBLEMS OPENING FILE: " FILENAME
             INPUT(IOVARNAME,IOVARNAME,FILENAME)   :S(RETURN_OPENIN)
     BADOPEN_OPENIN
         +   RAPN_EOF(READAPAGE_MASTERTABLE< FILENAME> ) = "EOF"
             OPENINPUTFILES = OPENINPUTFILES - 1
             OUTLISTING = OUTLISTING_ERROR "CANT OPEN FILE: " FILENAME
             OUTPUT = "ERROR - CANT OPEN FILE: " FILENAME   :(FRETURN)
     IBM_OPENIN
         +   INPUT(IOVARNAME,FILENAME)         :F(BADOPEN_OPENIN)
     RETURN_OPENIN
             OUTLISTING = OUTLISTING_MSG "OPENED FILE: " FILENAME
             OUTPUT = "OPENED FILE: " FILENAME       :(RETURN)
     END_OPENIN

-STITL     PADIT

DEFINE('PADIT(PAGE,STR,WHERE,COUNT)CNT')
```

```
+       :(ENDPADIT)
    PADIT
        CNT = 0
        PADIT = PAGE
    PADIT1 CNT = ?(PAGE< CNT + 1> ) CNT + 1 :F(RETURN)
        IDENT(PAGE< CNT> ,BOL)    :S(RETURN)
        PAGE< CNT> = IDENT(WHERE,'RIGHT') PAGE< CNT>
+       DUPL(STR,COUNT) :S(PADIT1)
        PAGE< CNT> = IDENT(WHERE,'LEFT') DUPL(STR,COUNT)
+       PAGE< CNT>  :(PADIT1)
    ENDPADIT

    -STITL      PATTERNS

DEFINE('PATTERNS()') :(ENDPATTERNS)
    PATTERNS
        &ANCHOR = 0
        ALPHA = 'ABCDEFGHIJKLMNOPQRSTUVWXYZ'
        UNQALPHA = &ALPHABET
        DIGITS = '0123456789'
        NUMBER = SPAN(DIGITS)
        NUMBERS = NUMBER| '*'
        NAME = ANY(ALPHA) ( SPAN(DIGITS ALPHA)| NULL )
        WORD = SPAN(DIGITS ALPHA)
        FILEWORD = SPAN(DIGITS ALPHA '/')
        BLANK = " "
        TAB = IDENT(MACHINE,"IBM")  SUBSTR(&ALPHABET,6,1)
        TAB = DIFFER(MACHINE,"IBM") SUBSTR(&ALPHABET,10,1)
        BT = SPAN('   ')
        HBT = SPAN('  - ')
        BTN = BT| NULL
        UNQALPHA '"' =
        UNQALPHA "'" =
        UNQBETA = UNQALPHA
        UNQBETA '(' =
        UNQBETA ')' =
        UNQBETA ';' =
        UNQGAMMA = UNQBETA
        UNQGAMMA ',' =
        &ANCHOR = DEFAULTANCHOR
        DLITERAL = '"' (NULL| SPAN(UNQALPHA '"')) '"'
        SLITERAL = "'" (NULL| SPAN(UNQALPHA "'")) "'"
        ELITERAL = SLITERAL| DLITERAL
        BASEEXP = SPAN(UNQBETA)| ELITERAL|
+       "(" ARBNO(*BASEEXP) ")"
        FULLEXP = BASEEXP ARBNO(BASEEXP)
        SMERGE = 'SIDE' HBT 'BY' HBT 'SIDE'
        OMERGE = 'ONE' HBT 'AFTER' HBT 'ANOTHER'
        LMERGE = 'LINE' HBT 'BY' HBT 'LINE'
        ALLMERGES = SMERGE| OMERGE| LMERGE
        NLITERAL = BT ELITERAL
        LLITERAL = ELITERAL ARBNO(NLITERAL)
        BASEEXP1 = SPAN(UNQGAMMA)| ELITERAL| ARBNO(*BASEEXP1)
****    BASEEXP2 = "(" BASEEXP1 ")"
        ENDOFDEF = BTN ( ANY(";") | RPOS(0) )
        VERB = 'REPLACE' BT 'EVERYTHING' BT 'BUT' |
```

```
'REPLACE' | 'CHOOSE' | 'REMOVE'
  | 'TRANSFORM' ( BT 'EVERYTHING' BT 'BUT' | NULL )
COMMENT = '"'
COMPILETIME = '@'
INITTIME = '<'
ENDTIME = '>'
INWSTIME = '='
COORDPAIRS = BTN '(' BTN NUMBERS . SVS1 BTN ','
  BTN NUMBERS . SVS2 BTN '-' BTN NUMBERS . SVS3 BTN ')' BTN
MONTHS = 'JANUARY' | 'FEBRUARY' | 'MARCH' | 'APRIL' |
  'MAY' | 'JUNE' | 'JULY' | 'AUGUST' | 'SEPTEMBER' |
  'OCTOBER' | 'NOVEMBER' | 'DECEMBER' | ('JAN' | 'FEB' |
  'MAR' | 'APR' | 'JUL' | 'JUN' | 'AUG' | 'SEP' | 'SEPT' |
  'OCT' | 'NOV' | 'DEC') ('.' | NULL)
YEARS = ANY(DIGITS) ANY(DIGITS) ANY(DIGITS) ANY(DIGITS)
DAYS = (ANY('012') | NULL) ANY(DIGITS) | '3' ('1' | '0')
NMON = ('0' ANY(DIGITS)) | '11' | '12' | ANY('123456789')
NYEAR = ANY(DIGITS) ANY(DIGITS)
NDATES = NMON '/' (DAYS '/' | NULL) NYEAR |
  NMON '-' (DAYS '-' | NULL) NYEAR
TIMES = (ANY('012') | NULL) ANY(DIGITS) ':' ANY('012345')
  ANY(DIGITS) ( ':' ANY('012345') ANY(DIGITS) | NULL)
MANYDATES = NDATES | MONTHS BT DAYS ',' BT YEARS
MANYDATESANDTIMES = MANYDATES | TIMES
ALLDATESANDTIMES = MANYDATESANDTIMES
TRIDATE = ANY(DIGITS) ANY(DIGITS) "/" ANY(DIGITS)
  ANY(DIGITS) "/" ANY(DIGITS) ANY(DIGITS)
TRITIME = ANY(DIGITS) ANY(DIGITS) ":" ANY(DIGITS)
  ANY(DIGITS) (":" ANY(DIGITS) ANY(DIGITS) | NULL)
TRIDATEORTIME = TRIDATE | TRITIME
TD = DATE()
TD NUMBER . MOND '/' NUMBER . DAYD '/' NUMBER . YEARD
MOND = SIZE(MOND,1) '0' MOND
DAYD = SIZE(DAYD,1) '0' DAYD
YEARD = SIZE(YEARD,1) '0' YEARD
TODAY = MOND ('-' | '/') (DAYD ('-' | '/') | NULL) YEARD

DEFERPATBASE = 'COLUMNS' | 'LINES' | 'STRINGS'
DEFERPAGEPAT = 'PAGES' | 'MESSAGES' | 'SCREENS'
DEFERPAT = DEFERPATBASE | DEFERPAGEPAT
PATSHAPES = 'LINES' | 'COLUMNS' | 'STRINGS' | 'BOXES'
NUMSHAPES = 'LINES' | 'COLUMNS'
COOSHAPES = 'STRINGS' | 'BOXES'

PAGERNGPAT = DEFERPAGEPAT
  BT 'FROM' HBT 'NUMBER' BTN '(' BTN
  NUMBER . RNGFROM BTN ')' BT 'TO' HBT 'NUMBER' BTN
  '(' BTN NUMBER . RNGTO BTN ')'

NUMPAT = NUMSHAPES . NTSHAP
  BT 'FROM' HBT 'NUMBER' BTN '(' BTN
  NUMBER . LEMON1 BTN ')' BT 'TO' HBT 'NUMBER' BTN
  '(' BTN NUMBER . LEMON2 BTN ')'

PATPAT = PATSHAPES . TSHAP
  BT 'FROM' HBT 'PATTERN' BTN '(' BTN FULLEXP . P1 BTN ')' BT
```

```
        +      'TO' HBT 'PATTERN'. BTN '(' BTN FULLEXP . P2 BTN ')'
        *

EPATPAT = PATSHAPES . TSHAP
        +      BT 'FROM' HBT 'EVERY' HBT 'PATTERN' BTN '(' BTN
        +      FULLEXP . P1 BTN ')' BT 'TO' HBT 'EVERY' HBT 'PATTERN'
        +      BTN '(' BTN FULLEXP . P2 BTN ')'
        *

COOPAT = COOSHAPES . CTSHAP BT 'FROM' HBT 'COORD'
        +      BTN '(' BTN NUMBER . LEMON1 BTN ',' BTN NUMBER . LEMON2
        +      BTN ')' BT 'TO' HBT 'COORD' BTN '(' BTN NUMBER . LEMON3
        +      BTN ',' BTN NUMBER . LEMON4 BTN ')'
        *

BLOCKPAT = 'BLOCKS' BT 'SEGMENTS' BTN '(' BTN
        +      (COORDPAIRS ARBNO(COORDPAIRS)) . SEGM BTN ')'
        *

CPATPAT = 'CLOUDS' BT 'PATTERN' BTN '(' BTN
        +      FULLEXP . CLOUDPAT BTN ')'

WHEREPAT = ( 'WHERE' | 'WHEN' )

*      BASESHAPE = ALL OF THE ABOVE QUALIFIEDS
               BASESHAPE = NUMPAT | COOPAT | PATPAT | EPATPAT |
        *      BLOCKPAT | CPATPAT
        *      SHAPE1 = BASESHAPES + DEFERREDS + PAGERNGPAT
               SHAPE1 = BASESHAPE | DEFERPAT | PAGERNGPAT
        *      SHAPE2 = ALL OF THE ABOVE PLUS THEY
               SHAPE2 = BASESHAPE | 'THEY' | DEFERPAT
               OPTWHERENOTEMPTYPAT =
        +               ( ( BT WHEREPAT BT 'NOT' BT 'EMPTY' ) | NULL )
               EOLPAT = BTN ";" BTN RPOS(0)
               ACTSTMT1 =
        +      BTN VERB . VB BT *SHAPE1 . S1 BT 'WITH' BT
        +      *FULLEXP . WITH BT WHEREPAT (BT 'LEFTOVERS' BT 'OF' | NULL)
        +      . EVB BT *SHAPE2 . S2 BT ('CONTAIN' |
        +      'DO' BT 'NOT' BT 'CONTAIN') . CONT BT *FULLEXP . PATT
        +      EOLPAT
        *

ACTSTMT2 =
        +      BTN VERB . VB BT *SHAPE1 . S1 BT WHEREPAT (BT 'LEFTOVERS' BT
        +      'OF' | NULL) . EVB BT *SHAPE2 . S2 BT ('CONTAIN' |
        +      'DO' BT 'NOT' BT 'CONTAIN') . CONT BT *FULLEXP . PATT
        +      EOLPAT
        *

ACTSTMT3 =
        +      BTN VERB . VB BT *SHAPE1 . S1 BT 'WITH' BT
        +      *FULLEXP . WITH
        +      EOLPAT
        *

ACTSTMT4 =
        +      BTN VERB . VB BT *SHAPE1 . S1 EOLPAT
        *

ACTSTMT = ACTSTMT1 | ACTSTMT2 | ACTSTMT3 | ACTSTMT4
        *

DEFSTMT = BTN 'DEFINE' BT (NAME . WSET) BT 'USING' BT
        +      (ARB . USINGS.) EOLPAT
               ENDSTMT = BTN 'END' BT (NAME . EWSET) EOLPAT
               PRSTMT = BTN 'PRINT' BT 'TO' BT '(' BTN FILEWORD . DD BTN
```

```
           +        ')' EOLPAT
                    TRSTMT = BTN 'TRANSLATE' BT 'FROM' BT LLITERAL . STR1
           +        BT 'TO' BT LLITERAL . STR2 EOLPAT
                    PADSTMT = BTN 'PAD' BT 'ON' BT 'THE' BT ('LEFT' | 'RIGHT')
           +        . DIRECTION BT 'WITH' BT NUMBER . HOWMANY BT
           +        LLITERAL . STR EOLPAT
                    REMSTMT = BTN 'REMEMBER' BT 'AS' BT NAME . NAMEIT
           +        OPTWHERENOTEMPTYPAT . REMEMP
           +        EOLPAT
                    WRSTMT = BTN 'WRITE' BT LLITERAL . STR BT
           +        'TO' BT '(' BTN NAME . NAMEIT BTN ')'
           +        EOLPAT
                    MRGSTMT = BTN 'MERGE' BT ALLMERGES . MRGTYPE
           +        BT ( "(" BTN STNAME BTN ")" | STNAME ) . MOBJ1
           +        BTN "," BTN ( "(" BTN STNAME BTN ")" | STNAME ) . MOBJ2
           +        OPTWHERENOTEMPTYPAT . MRGEMP
           +        EOLPAT
           +        COMPSTMT = BTN 'COMPARE' HBT 'PRINT' BT NAME . COMPNAME
           +        BT 'WHERE'
           +        BT 'OLD' BT 'FILE' BT 'IS' BT '(' BTN FILEWORD . OLDDD BTN ')'
           +        BT 'NEW' BT 'FILE' BT 'IS' BT '(' BTN FILEWORD . NEWDD BTN ')'
           +        BT 'DIFFERENCE'
           +            BT 'FILE' BT 'IS' BT '(' BTN FILEWORD . DIFFDD BTN ')'
           +        EOLPAT
                    INTERSTMT = BTN 'INTERSPERSE' HBT 'PRINT' BT NAME .
           +        INAME BT 'WHERE' BT 'INPUT' BT 'FILE'
           +        BT 'IS' BT '(' BTN NAME . ININTER BTN ')' BT 'OUTPUT'
           +        BT 'FILE' BT 'IS' BT '(' BTN NAME . OUTINTER BTN ')' BT
           +        'MERGE' HBT 'TYPE' BT 'IS' BT ALLMERGES . MRGTYPE BT
           +        ('REVERSED' . REVERSED BT | NULL) 'WORKING' BT 'SET' BT
           +        'KEY' BT 'SEGMENT' BT 'IS' BT COORDPAIRS . KEYINTER
           +        BT 'FILE' BT 'KEY' BT
           +        'SEGMENT' BT 'IS' BT COORDPAIRS . KEY2INTER
           +        EOLPAT   :(RETURN)
           ENDPATTERNS

-STITL  PARSEGEN FUNCTION --I--

DEFINE('PARSEGEN()')              :(END_PARSEGEN)
           PARSEGEN
           *       IF DESIRED, PUT A CHECK FOR STRING AS OPPOSED TO EXPRESSIONS
           *            FOR NON-CLOUDS AND NON-EVAL REPLACES
           IN_PARSEGEN
           +       STMT = GETSTMT()                  :F(RETURN)
                   STMT COMMENT                      :S(IN_PARSEGEN)
                   STMT COMPILETIME =                :F(INITSTUFF1_PARSEGEN)
                   YUPI = CODE(STMT ':(IN_PARSEGEN)')   :S< YUPI> F(IN_PARSEGEN)
           INITSTUFF1_PARSEGEN
           +       STMT INITTIME =                   :F(ENDSTUFF1_PARSEGEN)
                   INITCODE = INITCODE STMT          :(IN_PARSEGEN)
           ENDSTUFF1_PARSEGEN
           +       STMT ENDTIME =                    :F(DEF_PARSEGEN)
                   ENDCODE = ENDCODE STMT            :(IN_PARSEGEN)
           DEF_PARSEGEN
           +       STMT DEFSTMT                      :S(FRSTDEF_PARSEGEN)
                   OUTLISTING = OUTLISTING_ERROR
```

```
    +                   'STATEMENT BEFORE VALID DEFINE DISCARDED:'
    +                         :(IN_PARSEGEN)
    FRSTDEF_PARSEGEN
    +     CURWSET = WSET
          DEFSET(WSET,USINGS)
    IN2_PARSEGEN
    +     STMT = GETSTMT()              :F(RETURN)
          STMT COMMENT                  :S(IN2_PARSEGEN)
          STMT COMPILETIME =            :F(INITSTUFF_PARSEGEN)
          YUPI = CODE(STMT' :(IN2_PARSEGEN)')  :S< YUPI> F(IN2_PARSEGEN)
    INITSTUFF_PARSEGEN
    +     STMT INITTIME =               :F(ENDSTUFF_PARSEGEN)
          INITCODE = INITCODE STMT      :(IN2_PARSEGEN)
    ENDSTUFF_PARSEGEN
    +     STMT ENDTIME =                :F(WSSTUFF_PARSEGEN)
          ENDCODE = ENDCODE STMT        :(IN2_PARSEGEN)
    WSSTUFF_PARSEGEN
    +     STMT INWSTIME =               :F(PRSTUFF_PARSEGEN)
          NONCOMP< CURWSET> = NONCOMP< CURWSET> STMT :(IN2_PARSEGEN)
    PRSTUFF_PARSEGEN
    +     STMT PRSTMT                   :F(ISEND_PARSEGEN)
          IDENT(OUTFILETAB< DD> ,NULL)       :F(PR_PARSEGEN)
          OUTFILETAB< DD> = 'OPEN'
          IDENT(MACHINE,'IBM') OUTPUT(DD 'XXXXX',DD)
          DIFFER(MACHINE,'IBM') OUTPUT(DD 'XXXXX',DD 'XXXXX',DD ' -W')
    PR_PARSEGEN
    +     NONCOMP< CURWSET> = NONCOMP< CURWSET> ' PRINTPAGE(PAGE,'"
    +                 DD 'XXXXX");'
    +                         :(IN2_PARSEGEN)
    ISEND_PARSEGEN
    +     STMT ENDSTMT                  :F(ISACT_PARSEGEN)
          ENDSET(EWSET)                 :(IN2_PARSEGEN)
    ISACT_PARSEGEN
    +     EVB = NULL
          STMT ACTSTMT                  :F(ISDEF_PARSEGEN)
          S1 BTN PAGERNGPAT             :F(BUILDC_PARSEGEN)
          IDENT(S2,NULL)                :S(BUILDC_PARSEGEN)
          OUTLISTING = OUTLISTING_ERROR
    +        'CONTAIN CLAUSE FOR PAGE/MESSAGE RANGE DELETED'
          PATT = NULL
          CONT = NULL
          S2 = NULL
          MATCH(DEFERPAT RPOS(0),S2) (MATCH(DEFERPAT RPOS(0),SH1)
    +          IDENT(SH2,'THEY'))      :S(BUILDC_PARSEGEN)
          IDENT(EVB,NULL)               :S(BUILDC_PARSEGEN)
          OUTLISTING = OUTLISTING_ERROR
    +        '*LEFTOVERS OF* IN DEFERRED 2ND SHAPE DELETED'
          EVB = NULL
    BUILDC_PARSEGEN
    +     BUILDCODE(CURWSET,VB,S1,EVB,S2,WITH,CONT,PATT) :(IN2_PARSEGEN)
    ISDEF_PARSEGEN
    +     STMT DEFSTMT                  :F(TRSTMT_PARSEGEN)
          IDENT(CURWSET,NULL)           :S(YESDEF_PARSEGEN)
          OUTLISTING = OUTLISTING_ERROR
    +        'ATTEMPT TO DEFINE WITHOUT ENDING: END GENERATED'
```

```
    *    ENDSET(CURWSET,NULL)
         ENDSET(CURWSET)
    ***  CURWSET = WSET
    YESDEF_PARSEGEN
      +    DEFSET(WSET,USINGS)
           CURWSET = WSET                    :(IN2_PARSEGEN)
    TRSTMT_PARSEGEN
      +    STMT TRSTMT                       :F(PADSTMT_PARSEGEN)
           NONCOMP< CURWSET> = NONCOMP< CURWSET>
      +      ' PAGE = NOTNULLPG(PAGE) TRANSL(PAGE,' STR1 ';' STR2 ');'
      +                                      :(IN2_PARSEGEN)
    PADSTMT_PARSEGEN
      +    STMT PADSTMT                      :F(REMSTMT_PARSEGEN)
           NONCOMP< CURWSET> = NONCOMP< CURWSET>
      +      ' PAGE = NOTNULLPG(PAGE) PADIT(PAGE,' STR ','''
      +    DIRECTION ''','HOWMANY');'
      +                                      :(IN2_PARSEGEN)
    REMSTMT_PARSEGEN
      +    STMT REMSTMT                      :F(WRSTMT_PARSEGEN)
           NONCOMP< CURWSET> = IDENT(REMEMP,NULL) NONCOMP< CURWSET>
      +      ' REMEMBERY<''' NAMEIT '''> = COPY(PAGE);'  :S(IN2_PARSEGEN)
           NONCOMP< CURWSET> = NONCOMP< CURWSET>
      +      ' REMEMBERY<''' NAMEIT '''> = NOTNULLPG(PAGE) COPY(PAGE);'
      +                                      :S(IN2_PARSEGEN)
    *   WRITE ASSUMES FILE IS OPEN
    WRSTMT_PARSEGEN
      +    STMT WRSTMT                       :F(MRGSTMT_PARSEGEN)
           IDENT(OUTFILETAB< NAMEIT> ,NULL)  :F(WRSTMT2_PARSEGEN)
           OUTFILETAB< NAMEIT> = 'WRITE'
           IDENT(MACHINE,'IBM') OUTPUT(NAMEIT 'XXXXX',NAMEIT)
           DIFFER(MACHINE,'IBM') OUTPUT(NAMEIT 'XXXXX',
      +                NAMEIT 'XXXXX',NAMEIT ' -W')
    WRSTMT2_PARSEGEN
      +    NONCOMP< CURWSET> = NONCOMP< CURWSET> ' ' NAMEIT 'XXXXX'
      +       ' = ''' STR ''';'               :(IN2_PARSEGEN)
    MRGSTMT_PARSEGEN
      +    STMT MRGSTMT                      :F(COMPSTMT_PARSEGEN)
    * PATTERN SETS: MRGTYPE MOBJ1 MOBJ2 MRGEMP
           BUILDMERGE(CURWSET,MRGTYPE,MOBJ1,MOBJ2,MRGEMP)
      +                                      :(IN2_PARSEGEN)
    COMPSTMT_PARSEGEN
      +    STMT COMPSTMT                     :F(INTERSTMT_PARSEGEN)
           IDENT(NONUSINGINS< OLDDD> ,NULL)  :F(COMPST0_PARSEGEN)
           NONUSINGINS< OLDDD> = 'COMPARE'
           OPENIN(OLDDD)
    COMPST0_PARSEGEN
      +    IDENT(OUTFILETAB< NEWDD> ,NULL)   :F(COMPST1_PARSEGEN)
           OUTFILETAB< NEWDD> = 'COMPARE'
           IDENT(MACHINE,'IBM') OUTPUT(NEWDD 'XXXXX',NEWDD)
           DIFFER(MACHINE,'IBM') OUTPUT(NEWDD 'XXXXX',NEWDD 'XXXXX',
      +    NEWDD ' -W')
    COMPST1_PARSEGEN
      +    NONCOMP< CURWSET> = NONCOMP< CURWSET> ' PRINTPAGE(PAGE,'''
      +                NEWDD 'XXXXX'');'
           IDENT(OUTFILETAB< DIFFDD> ,NULL)  :F(COMPST2_PARSEGEN)
           OUTFILETAB< DIFFDD> = 'COMPARE'
           IDENT(MACHINE,'IBM') OUTPUT(DIFFDD 'XXXXX',DIFFDD)
```

```
        DIFFER(MACHINE,'IBM') OUTPUT(DIFFDD 'XXXXX',
   +       DIFFDD 'XXXXX',DIFFDD ' -W')
        COMPST2_PARSEGEN
   +       NONCOMP< CURWSET> = NONCOMP< CURWSET>
   +          ' (IDENT(PAGE< 1> ,BOL) DIFFER(PAGE< 0> ,EOF)) '
   +          ' COMPAIRE(PAGE,READFORCOMPS('"
   +             OLDDD '"),'" DIFFDD 'XXXXX','" COMPNAME '");'
   +                            :(IN2_PARSEGEN)
        INTERSTMT_PARSEGEN
   +       STMT INTERSTMT                 :F(BADSTMT_PARSEGEN)
        IDENT(NONUSINGINS< ININTER> ,NULL) :F(INTERST1_PARSEGEN)
        NONUSINGINS< ININTER> = 'INTER'
        OPENIN(ININTER)
        INTERST1_PARSEGEN
   +       IDENT(OUTFILETAB< OUTINTER> ,NULL)    :F(INTERST2_PARSEGEN)
        OUTFILETAB< OUTINTER> = 'INTER'
        IDENT(MACHINE,'IBM') OUTPUT(OUTINTER 'XXXXX',OUTINTER)
        DIFFER(MACHINE,'IBM') OUTPUT(OUTINTER 'XXXXX',
   +        OUTINTER 'XXXXX',OUTINTER '-W')
        INTERST2_PARSEGEN
   +       BUILDINTERSPERSE(ININTER 'NNNNN',OUTINTER 'XXXXX',
   +       KEYINTER,KEY2INTER,MRGTYPE,INAME,CURWSET,REVERSED)
   +                            :(IN2_PARSEGEN)
        BADSTMT_PARSEGEN
   +       OUTLISTING = OUTLISTING_ERROR
   +             ' INVALID STATEMENT: ' STMT :(IN2_PARSEGEN)
        END_PARSEGEN

   -STITL    PRINTPAGE

DEFINE('PRINTPAGE(PTR,DD,CCVAL,CCTOP)COUNTER,CC')
   +                          :(ENDPRINTPAGE)
        PRINTPAGE
           CC = CCTOP
        CCVAL = IDENT(IBMCC,1) " "
        CC = IDENT(IBMCC,1) '1'
        COUNTER = 1
        IDENT(PTR,NULL)              :S(RETURN)
        NEXTOUT IDENT(PTR< COUNTER> ,BOL)        :S(RETURN)
        $DD = CC PTR< COUNTER>
        CC = IDENT(IBMCC,1) CCVAL
        COUNTER = ?(PTR< COUNTER + 1> ) COUNTER + 1 :S(NEXTOUT)F(RETURN)
        ENDPRINTPAGE

-STITL    PROCESS PROGRAM

        DEFINE('PROCESS()1') :(ENDPROCESS_PROCESS)
        PROCESS
        *
        *   GENERATE FINAL END IF NECESSARY
        *
        GEN_END_PROCESS
   +       IDENT(CURWSET)           :S(INIT_CODE_PROCESS)
           OUTLISTING = OUTLISTING_MSG 'FINAL END GENERATED'
           ENDSET(CURWSET)
```

```
*
*      PEFORM INITIAL CODE, IF ANY
*
INIT_CODE_PROCESS
+      COMPINITCODE_PROCESS = DIFFER(INITCODE,NULL)
+      CODE(INITCODE ' :(PREPARE_PROCESS)')
+      :S< COMPINITCODE_PROCESS>
*
*      PREPARE CONTROL ARRAY FOR PROCESSING
*
PREPARE_PROCESS
+      INPUTARRAY = CONVERT(INPUTTAB,'ARRAY')
       I = 1
OPEN_PROCESS
+      OPENIN(INPUTARRAY< I,1> )
       I = ?(INPUTARRAY< I + 1, 1> ) I + 1 :S(OPEN_PROCESS)
       OUTPUT = PUT("INPUTARRAY< 1,1> ")
       OUTPUT = PUT("OPENINPUTFILES")
       I = 0
START_READING_PROCESS
+      LE(OPENINPUTFILES,0)     :S(ENDCODE_PROCESS)
       I = I + 1
       IDENT(DEFAULTREAD,'ROUNDROBIN') :S(ROUNDCODE_PROCESS)
       GT(I,MAXFILE)           :S(PASSEOFPRE_PROCESS)
       ?(INPUTARRAY< I,1> )     :F(PASSEOFPRE_PROCESS)
       IDENT(INPUTARRAY< I,1> ,NULL)
+            :S(PASSEOFPRE_PROCESS)F(CALLFILEROUT_PROCESS)
ROUNDCODE_PROCESS
+      I = GT(I,MAXFILE) 1
       I = (?(INPUTARRAY< I,1> )) 1
       I = IDENT(INPUTARRAY< I,1> ,NULL) 1
CALLFILEROUT_PROCESS
+      FILEROUTINE()   :(START_READING_PROCESS)
*
*      IF END OF PROCESSING MAY HAVE BEEN REACHED
*      DURING NON-ROUNDROBIN PROCESSING
*
PASSEOFPRE_PROCESS
       I = 1
       DEFAULTREAD = 'ROUNDROBIN'
       PASSINGEOFS = 'YES'
*
*      KEEP LOOPING UNTIL ALL FILES ARE CLOSED
*
PASSEOF_PROCESS
+      FILEROUTINE()
       LE(OPENINPUTFILES,0)   :S(ENDCODE_PROCESS)
       I = LT(I,MAXFILE) ?(INPUTARRAY< I + 1,1> )
+      DIFFER(INPUTARRAY< I + 1,1> ,NULL)
+      I + 1 :S(PASSEOF_PROCESS)
       I = 1 :(PASSEOF_PROCESS)
*
*      DO END OF PHASER PROGRAM CODE
*
ENDCODE_PROCESS
       COMPENDCODE_PROCESS = DIFFER(ENDCODE,NULL)
```

```
    +     CODE(ENDCODE ' :(RETURN)')
    +          :S< COMPENDCODE_PROCESS> F(RETURN)
    ENDPROCESS_PROCESS

-STITL         PUT - PUT.S

PUT
    +     PUT = S ":< " EVAL(S) "> " :(RETURN)
    END_PUT

-STITL         READAPAGE - READAPAGE.S

* READAPAGE(FILENAME)
    *    READAPAGE WILL RETURN THE NEXT PAGE FROM THE FILENAME FILE.
    *    THE FILES ARE INDEXED IN A TABLE BY THE FILENAME'S.
    *
    *    IF PRIOR EOF THEN IT WILL FRETURN, OTHERWISE IT RETURNS THE PAGE.
    *
    *    THE FOLLOWING GLOBALS ARE USED:
    *       READAPAGE_MASTERTABLE  -> TABLE OF DATASTRUCTURES
    *                    READAPAGE_NODE, ONE
    *                    PER FILE. SET IN OPENIN.
    *       OPENINPUTFILES      -> NUMBER OF CURRENTLY OPEN FILES,
    *                    DECREMENTED HERE, INCREMENTED IN
    *                    OPENIN.
    *       BOL          -> END OF PAGE MARKER.
    *       NULLPAGE       -> AN EMPTY PAGE.
    *       PAGESIZE       -> MAX PAGE SIZE.
    *       READAPAGE_NODE    -> DATASTRUCTURE, WITH FIELDS:
    *         RAPN_IOVARNAME    -> NAME OF INPUT ASSOCIATED VARIABLE
    *         RAPN_PAGENO     -> CURRENT PAGE NUMBER
    *         RAPN_LINE      -> LINE BUFFER FOR PAGE OVERFLOW
    *         RAPN_IBMCC    ,  -> IS IBMCC ON OR OFF?
    *         RAPN_PAGESTART   -> PATTERN FOR START OF PAGE
    *         RAPN_BLANKCOUNT   -> NUMBER OF BLANK LINES IN BUFFER
    *         RAPN_EOF       -> IF NON-NULL THEN PRIOR EOF
        DEFINE("READAPAGE(FILENAME)RAPN,LINE,CC,LINENO,IOVARNAME"
    +           ",PAGESTART,BUFF,BLANKCOUNT")  :(END_READAPAGE)
    READAPAGE
    +    RAPN = READAPAGE_MASTERTABLE< FILENAME>
        IDENT(RAPN)              :F(OKTABLEENT_READAPAGE)
        OUTLISTING = OUTLISTING_ERROR
    +        "INTERNAL ERROR ATTEMPT TO READ FROM FILENAME: "
    +            FILENAME " FILE NOT OPEN - OPENING !!"
        OPENIN(FILENAME)             :(READAPAGE)
    OKTABLEENT_READAPAGE
    +    PAGESTART = RAPN_PAGESTART(RAPN)
        BUFF = RAPN_LINE(RAPN)
        BLANKCOUNT = RAPN_BLANKCOUNT(RAPN)
        READAPAGE = COPY(NULLARRAY)
        IOVARNAME = RAPN_IOVARNAME(RAPN)
    ********************************************:(READLOOP_READAPAGE)
    READLOOP_READAPAGE
        LINE = GT(BLANKCOUNT,0) BLANKLINE    :F(NOTBLANK_READAPAGE)
        BLANKCOUNT = BLANKCOUNT - 1       :(TESTSTART_READAPAGE)
    NOTBLANK_READAPAGE
    +    IDENT(RAPN_EOF(RAPN))           :F(FRETURN)
```

```
        LINE = DIFFER(BUFF) BUFF
    +                               :F(FROMFILE_READAPAGE)
        BUFF = NULL                 :(GOTLINE_READAPAGE)
      FROMFILE_READAPAGE
    +   LINE = $IOVARNAME           :S(NOTEOF_READAPAGE)
        RAPN_EOF(RAPN) = "EOF"      :(EOF_READAPAGE)

NOTEOF_READAPAGE
    +   EQ(RAPN_IBMCC(RAPN),1)      :F(TESTSTART_READAPAGE)
        LINE LEN(1) . CC =          :F(GOTLINE_READAPAGE)
        IDENT(CC," ")               :S(TESTSTART_READAPAGE)
        IDENT(CC,"1")               :S(EOP_READAPAGE)
        IDENT(CC,"+")               :S(READLOOP_READAPAGE)
        DIFFER(CC,"0")              :S(NOT0_READAPAGE)
        BUFF = LINE
        LINE = BLANKLINE            :(TESTSTART_READAPAGE)

      NOT0_READAPAGE
    +   BUFF = IDENT(CC,"-") LINE   :F(TESTSTART_READAPAGE)
        LINE = BLANKLINE
        BLANKCOUNT = 1

TESTSTART_READAPAGE
    +   LINE POS(0) PAGESTART       :F(GOTLINE_READAPAGE)

EOP_READAPAGE
    *+  EQ(LINENO,0) EQ(RAPN_PAGENO(RAPN),0)   :S(GOTLINE_READAPAGE)
        EQ(LINENO,0)                :S(GOTLINE_READAPAGE)

OVERFLOW_READAPAGE
    +   RAPN_PAGENO(RAPN) = RAPN_PAGENO(RAPN) + 1
        BUFF = LINE                 :(RETURN_READAPAGE)

GOTLINE_READAPAGE
    +   LINENO = LINENO + 1
        READAPAGE = (READAPAGE<LINENO> ) ENLARGEPAGE(READAPAGE)
40      READAPAGE<LINENO> = LINE    :(READLOOP_READAPAGE)

EOF_READAPAGE
    +   RAPN_LINE(RAPN) = BUFF
        RAPN_BLANKCOUNT(RAPN) = BLANKCOUNT
        OPENINPUTFILES = OPENINPUTFILES - 1
        EQ(LINENO,0)                :S(FRETURN)
        OUTLISTING = OUTLISTING_MSG "END OF FILE "
    +       " PAGENO: " LPAD(RAPN_PAGENO(RAPN) + 1,6)
    +       " FILE: " FILENAME
      RETURN_READAPAGE
    +   RAPN_LINE(RAPN) = BUFF
        READAPAGE<LINENO + 1> = BOL :(RETURN)
      END_READAPAGE

-STTL     READORNULL – READORNULL.S

DEFINE('READORNULL(DD2)')   :(END_READORNULL)
      READORNULL
    +   IDENT(PASSINGEOFS,'YES')    :S(EOF_READORNULL)
        READORNULL = READAPAGE(DD2) :S(RETURN)
```

```
         EOF_READORNULL
     +      READORNULL = COPY(EOFARRAY)    :(RETURN)
     END_READORNULL

-STTTL     READFORCOMPS

DEFINE('READFORCOMPS(DD)') :(ENDREADFORCOMPS)
     READFORCOMPS
          READFORCOMPS = READAPAGE(DD)  :S(RETURN)
     *    READFORCOMPS = COPY(NULLARRAY)    :(RETURN)
          READFORCOMPS = COPY(EOFARRAY)     :(RETURN)
     ENDREADFORCOMPS

-STTTL     ROUT

          DEFINE('ROUT(PAGE,DEPENDENT,CALLSTRING)LIST3OFDEP'):(END_ROUT)
     ROUT
     +    WSPGCOUNT<DEPENDENT> = NOTNULLPG(PAGE) WSPGCOUNT<DEPENDENT> + 1
     *    OUTPUT = "ABOUT TO BRANCH"
     *    OUTPUT = PUT("DEPENDENT")
     *    OUTPUT = PUT("DATATYPE(CODETAB<DEPENDENT>)")
              :<CODETAB<DEPENDENT>>
     BACK   LIST3OFDEP = TEMPASSO<DEPENDENT>   :F(RETURN)
     NDEP   LIST3OFDEP ';' WORD . DEP2 =    :F(RETURN)
          IDENT(LOOPCHECKING,'OFF')     :S(NOLOOP)
          ISALOOP()              :F(NOLOOP)
          SIGLOOP()              :(END)
     NOLOOP  CALLSTRING = ';' DEP2 CALLSTRING
          LIST3OFDEP ';' WORD :F(LASTONE)
          ROUT(COPY(PAGE),DEP2,CALLSTRING)    :(NDEP)
     LASTONE ROUT(PAGE,DEP2,CALLSTRING)       :(NDEP)
     END_ROUT

-STTTL     SEGSFROMPATTERNS

DEFINE('SEGSFROMPT(SHAPE,PAGE)TSHAP,P1,P2,CNT,'
     +    'C1,CNT2,C2,TEMP1,TEMP2,TEMP3,TEMP4,HEAD,CURRENT')
     +         :(ENDSEGSFROMPT)
     SEGSFROMPT
        MATCH(PATPAT,SHAPE)   :F(BADSHAPEINSEGSFRPATT)
          P1 = EVAL(P1)
          P2 = EVAL(P2)
          &ANCHOR = 0
          CNT = 1
     LSFP   (?(PAGE<CNT>) DIFFER(PAGE<CNT>,BOL)) :S(RETURN)
     *    OUTPUT = 'P1 IS:' P1
10        PAGE<CNT> @C1 P1 :S(FOUNDBEGIN)
     *    OUTPUT = 'PAGE(' CNT ') IS:' PAGE<CNT>
          CNT = CNT + 1 :(LSFP)
     FOUNDBEGIN
     *    OUTPUT = 'FOUNDBEGIN- C1:' C1
15        PAGE<CNT> P2 @C2 *GT(C2,C1) :S(FOUNDEND)
          CNT2 = CNT
     LSFP2  (?(PAGE<CNT2>) DIFFER(PAGE<CNT2>,BOL)) :S(RETURN)
          PAGE<CNT2> P2 @C2 :S(FOUNDEND)
          CNT2 = CNT2 + 1 :(LSFP2)
```

```
    FOUNDEND
    *     OUTPUT = 'FOUND END- C2:' C2
          IDENT(TSHAP,'LINES') :S(FLINGO)
          IDENT(TSHAP,'COLUMNS') :S(FCOLGO)
          IDENT(TSHAP,'BOXES') :S(FBOXGO)
          IDENT(TSHAP,'STRINGS') :S(FSTRGO)
          :(BADSHAPEINSEGSFRPT)
    FLINGO TEMP1 = CNT
          TEMP2 = CNT2
          HEAD = SEGMENT(TEMP1,1,'*')
          SEGSFROMPT = HEAD
          CURRENT = HEAD
    LOOPLN1 EQ(TEMP1,TEMP2) :S(RETURN)
          TEMP1 = TEMP1 + 1
          NEXT(CURRENT) = SEGMENT(TEMP1,1,'*')
          CURRENT = NEXT(CURRENT) :(LOOPLN1)
    FCOLGO TEMP1 = C1 + 1
          TEMP2 = C2
    *    IF TEMP2 < TEMP1 THEN THIS WILL PROBABLY NOT DO ANYTHING
          SEGSFROMPT = SEGMENT('*',TEMP1,TEMP2) :(RETURN)
    FBOXGO TEMP1 = CNT
          TEMP2 = C1 + 1
          TEMP3 = CNT2
          TEMP4 = C2
    *    TEMP4 SHOULD BE GREATER THAN TEMP2
          HEAD = SEGMENT(TEMP1,TEMP2,TEMP4)
          SEGSFROMPT = HEAD
          CURRENT = HEAD
    LOOPBX1 EQ(TEMP1,TEMP3) :S(RETURN)
          TEMP1 = TEMP1 + 1
          NEXT(CURRENT) = SEGMENT(TEMP1,TEMP2,TEMP4)
          CURRENT = NEXT(CURRENT) :(LOOPBX1)
    FSTRGO TEMP1 = CNT
          TEMP2 = C1 + 1
          TEMP4 = C2
          SEGSFROMPT = SEGMENT(TEMP1,TEMP2,TEMP4) :(RETURN)
    ENDSEGSFROMPT

    -STITL    SHAPESFROMSEGS

DEFINE('SHAPESFROMSEGS(SH1,HEAD)HEAD2,CURRENT2,CURRENT'
    +     'TONEWLIST,GREATER,LESS,OLDHEAD2')
    +            :(ENDSHAPESFROMSEGS)
    SHAPESFROMSEGS
          SHAPESFROMSEGS = IDENT(SH1,'STRINGS') HEAD :S(RETURN)
          IDENT(HEAD,NULL) :S(RETURN)
          IDENT(SH1,'LINES')   :F(BRCOLS)
          CURRENT = HEAD
          HEAD2 = SEGMENT(LINEN(CURRENT),1,'*')
          SHAPESFROMSEGS = HEAD2
          CURRENT2 = HEAD2
    NEELEM CURRENT = DIFFER(NEXT(CURRENT),NULL) NEXT(CURRENT)
    +            :F(RETURN)
          NEXT(CURRENT2) = SEGMENT(LINEN(CURRENT),1,'*')
          CURRENT2 = NEXT(CURRENT2) :(NEELEM)
    BRCOLS
          IDENT(SH1,'COLUMNS') :F(BADSHAPEINSHFRSEGS)
```

```
        CURRENT = HEAD
        HEAD2 = SEGMENT('*',START(CURRENT),FINISH(CURRENT))
   *     SHAPESFROMSEGS = HEAD2
        CURRENT2 = HEAD2
  NEELEM2 CURRENT = DIFFER(NEXT(CURRENT),NULL) NEXT(CURRENT)
+                :F(SORDIT)
        NEXT(CURRENT2) = SEGMENT('*',START(CURRENT),FINISH(CURRENT))
        CURRENT2 = NEXT(CURRENT2) :(NEELEM2)
  SORDIT TONEWLIST = SEGMENT(0,0,0,HEAD2)
        HEAD2 = DIFFER(NEXT(HEAD2),NULL) NEXT(HEAD2) :F(STRIPHEAD)
        NEXT(NEXT(TONEWLIST)) = NULL
  LOOOP1 LESS = TONEWLIST
        GREATER = NEXT(TONEWLIST)
  LOOOP  IDENT(GREATER,NULL) :S(INSERT)
        LT(START(HEAD2),START(GREATER)) :S(INSERT)
        LESS = GREATER
        GREATER = NEXT(GREATER) :(LOOOP)
   INSERT OLDHEAD2 = HEAD2
        HEAD2 = NEXT(HEAD2)
        DIFFER(GREATER,NULL) EQ(START(OLDHEAD2),START(GREATER))
+       IDENT(FINISH(OLDHEAD2),FINISH(GREATER)) :S(SEND)
        NEXT(LESS) = OLDHEAD2
        NEXT(OLDHEAD2) = GREATER
  SEND   IDENT(HEAD2,NULL) :F(LOOOP1)
  STRIPHEAD
        TONEWLIST = NEXT(TONEWLIST)
        SHAPESFROMSEGS = TONEWLIST    :(RETURN)
   ENDSHAPESFROMSEGS
   -STITL     SIGLOOP

DEFINE('SIGLOOP()')                :(ENDSIGLOOP)
  SIGLOOP
        OUTLISTING = OUTLISTING_ERROR 'LOOP LOOP LOOP' :(RETURN)
   ENDSIGLOOP

-STITL     TRANSL

DEFINE('TRANSL(PAGE,STR1,STR2)CNT')
+       :(ENDTRANSL)
  TRANSL CNT = 0
        TRANSL = PAGE
  TRANS1 CNT = ?(PAGE< CNT + 1> ) CNT + 1 :F(RETURN)
        IDENT(PAGE< CNT> ,BOL)  :S(RETURN)
        PAGE< CNT> = REPLACE(PAGE< CNT> ,STR1,STR2) :(TRANS1)
  ENDTRANSL

   -STITL    MAIN PROGRAM

MAINPROGRAM
        INITIALIZE()
        PATTERNS()
        PARSEGEN()
        PROCESS()
  END
```

What is claimed is:

1. In a data processing system producing a plurality of reports each comprising a plurality of pages, each said page comprising a plurality of lines of output text data, a post-processor for such text data comprising
   means for selectively identifying two dimensional patterns of pluralities of portions of said lines of text data,
   means for storing said patterns, and
   means utilizing said stored patterns for processing said pages to produce modified additional reports,
   said means for selectively identifying comprising
   means for generating patterns to be matched to identify first portions of said pages,
   means for generating starting and ending line and column specifications to identify second portions of said pages, and
   means for representing said first portions and said second portions of said pages in a common format.

2. The post-processor according to claim 1 wherein said means for identifying comprises
   means for selectively identifying pages, columns, lines, strings and blocks of data in said reports.

3. The post-processor according to claim 1 wherein said means for utilizing said stored patterns comprises
   means for choosing, removing, replacing and replacing everything but said patterns.

4. In a data processing system producing a plurality of reports each comprising a plurality of pages, each said page comprising a plurality of lines of output text data, a method of processing such text data comprising the steps of
   selectively identifying two dimensional patterns of a plurality of said lines of text data,
   storing said patterns for later use, and
   processing said pages utilizing said stored patterns to produce modified additional reports,
   said step of selectively identifying comprising the steps of
   generating patterns to be matched to identify first portions of said pages,
   generating starting and ending line and column specifications of second portions of said pages, and
   representing said first portions and said second portions of said pages in a common format.

5. The method according to claim 4 wherein said step of selectively identifying comprises the step of
   identifying pages, columns, lines, strings and blocks of data in said reports.

6. The method according to claim 4 wherein said step of processing comprises the step of
   choosing, removing, replacing or replacing everything but said so identified patterns.

* * * * *